(12) United States Patent
Etsion et al.

(10) Patent No.: US 10,579,390 B2
(45) Date of Patent: Mar. 3, 2020

(54) EXECUTION OF DATA-PARALLEL PROGRAMS ON COARSE-GRAINED RECONFIGURABLE ARCHITECTURE HARDWARE

(71) Applicant: Technion Research & Development Foundation Ltd., Haifa (IL)

(72) Inventors: Yoav Etsion, Atlit (IL); Dani Voitsechov, Amirim (IL)

(73) Assignee: TECHNION RESEARCH & DEVELOPMENT FOUNDATION LTD., Haifa (IL)

(*) Notice: Subject to any disclaimer, the term of this patent is extended or adjusted under 35 U.S.C. 154(b) by 228 days.

(21) Appl. No.: 15/829,924

(22) Filed: Dec. 3, 2017

(65) Prior Publication Data

US 2018/0101387 A1 Apr. 12, 2018

Related U.S. Application Data

(63) Continuation of application No. 14/642,780, filed on Mar. 10, 2015.

(60) Provisional application No. 61/969,184, filed on Mar. 23, 2014.

(51) Int. Cl.
*G06F 9/30* (2018.01)
*G06F 9/38* (2018.01)
*G06F 9/48* (2006.01)
*G06F 9/448* (2018.01)
*G06F 9/44* (2018.01)

(52) U.S. Cl.
CPC .............. *G06F 9/3869* (2013.01); *G06F 9/38* (2013.01); *G06F 9/3851* (2013.01); *G06F 9/448* (2018.02); *G06F 9/4421* (2013.01); *G06F 9/4436* (2013.01); *G06F 9/4494* (2018.02); *G06F 9/4881* (2013.01)

(58) Field of Classification Search
None
See application file for complete search history.

(56) References Cited

U.S. PATENT DOCUMENTS

2010/0122105 A1* 5/2010 Arslan ................ G06F 15/7867
713/500

* cited by examiner

*Primary Examiner* — Corey S Faherty
(74) *Attorney, Agent, or Firm* — Kligler & Associates Patent Attorneys Ltd

(57) ABSTRACT

A GPGPU-compatible architecture combines a coarse-grain reconfigurable fabric (CGRF) with a dynamic dataflow execution model to accelerate execution throughput of massively thread-parallel code. The CGRF distributes computation across a fabric of functional units. The compute operations are statically mapped to functional units, and an interconnect is configured to transfer values between functional units.

18 Claims, 12 Drawing Sheets

FIG. 4 | 4A / 4B |

(a) Accesses in DFG    (b) Original Code (a) Control-Data Flow Graph   (b) Original Control Code

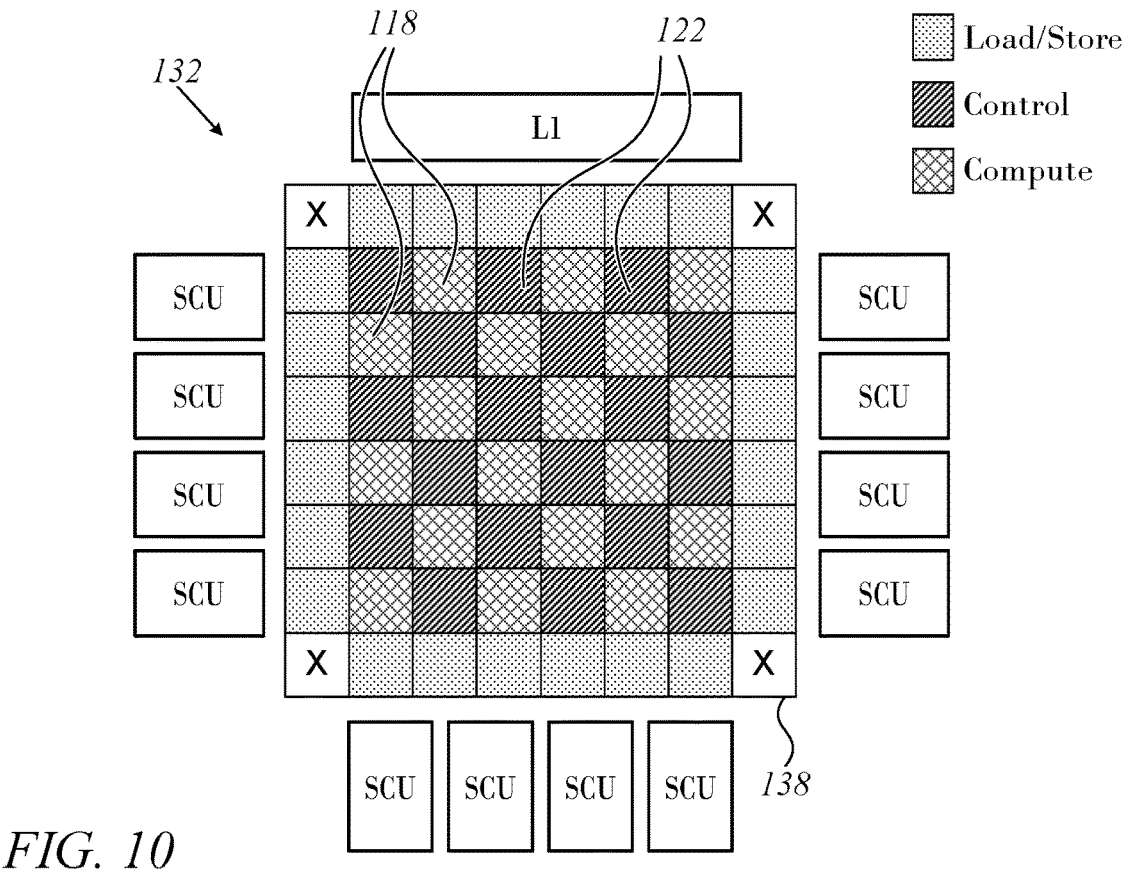
*FIG. 10*
*FIG. 11*
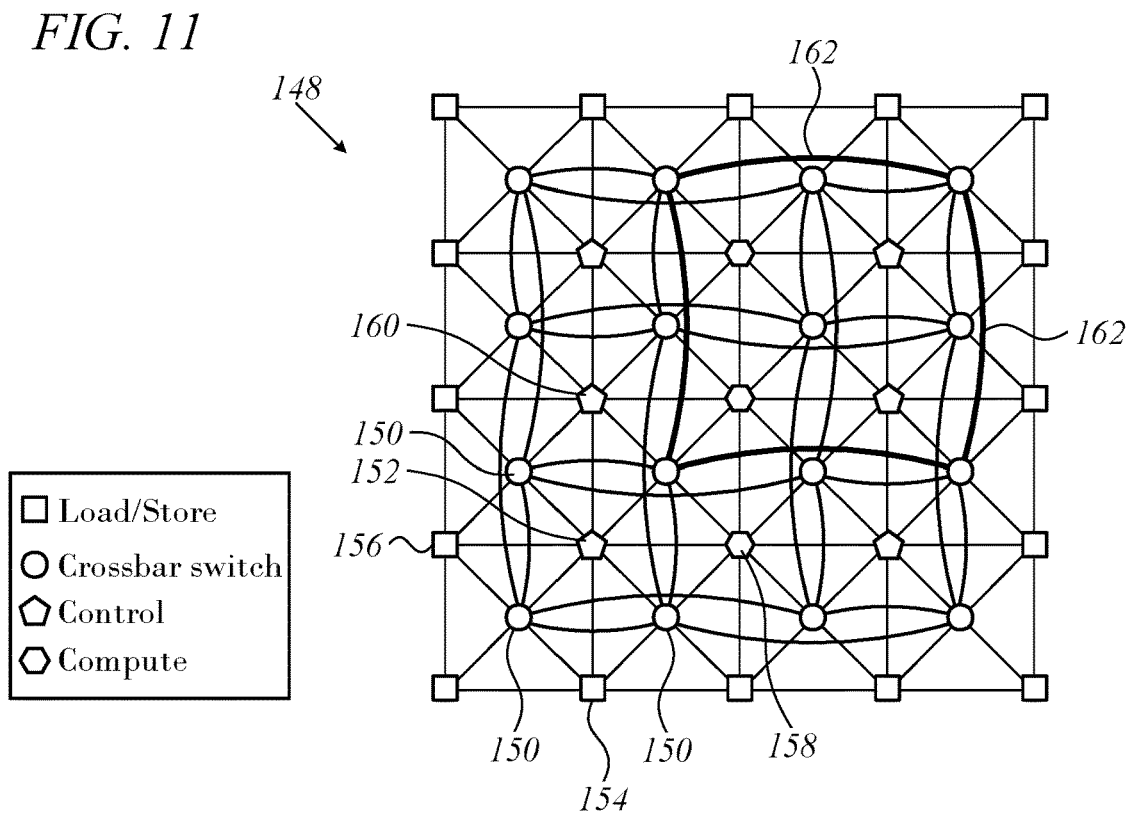

| Application | Application Domain | Kernels | Description |
|---|---|---|---|
| CFD | Fluid Dynamics | compute_step_factor,cuda_time_step | Computational fluid dynamics solver |
| NN | Data Mining | euclid | K nearest neighbor distance calculator |
| PF | Medical Imaging | normalize_weights_kernel | Particle filter-target location estimator |
| BFS | Graph Algorithms | kernel2 | Breadth-first search |
| GE | Linear Algebra | Fan1, Fan2 | Gaussian elimination-linear system solver |
| BPNN | Pattern Recognition | bpnn_adjust_weights_cuda | Back Propagation-training of a neural network |

*FIG. 12*

EXECUTION OF DATA-PARALLEL PROGRAMS ON COARSE-GRAINED RECONFIGURABLE ARCHITECTURE HARDWARE

CROSS-REFERENCE TO RELATED APPLICATIONS

This Application is a Continuation of U.S. application Ser. No. 14/642,780, filed 10 Mar. 2015, which claims the benefit of U.S. Provisional Application No. 61/969,184, filed 23 Mar. 2014, both of which are herein incorporated by reference.

BACKGROUND OF THE INVENTION

1. Field of the Invention

This invention relates to administration of task execution in a digital data processing system. More particularly, this invention relates to transaction and job processing between multiple processors, computers, or digital data processing systems

2. Description of the Related Art

The meanings of certain acronyms and abbreviations used herein are given in Table 1.

TABLE 1

Acronyms and Abbreviations

| | |
|---|---|
| 8-NN | Eight Nearest Neighbors |
| ALU | Arithmetical-Logical Unit |
| CDFG | Control Data Flow Graph |
| CGRF | Coarse Grain Reconfigurable Fabric |
| CUDA | Compute Unified Device Architecture |
| DRAM | Dynamic Random Access Memory |
| FCFR | First Come First Read |
| FIFO | First-In-First-Out |
| FLOP | Floating Point Operation |
| FPU | floating point unit |
| FR-FCFS | First Ready - First Come First Served |
| GDDR5 | Graphics Double Data Rate, version 5 |
| GPGPU | General-purpose Computation on Graphics-processing Units (Also denotes GPUs used for general-purpose computing) |
| GPU | Graphics-processing Unit |
| I/O | Input/output |
| LDST | Load/Store |
| LLVM | Low Level Virtual Machine |
| LUT | Look-up Table, e.g., k-input LUT |
| MSHR | Miss-Status Holding Register |
| NUCA | Non-Uniform Cache architecture |
| OpenCL | Open Computing Language |
| RF | Register File |
| RTL | Register Transfer Level |
| SGMF | Single Graph Multiple Flows |
| SIMT | Single Instruction Multiple Threads |
| SM | Streaming Multiprocessor |
| SMT | Simultaneous Multithreading |
| SSA | Static Single Assignment Form |
| TID | Thread Identifier |

GPGPUs are gaining track as mainstream processors for scientific computing. These processors deliver high computational throughput and are highly power efficient (in terms of FLOPs/Watt). Nevertheless, existing GPGPUs employ a von-Neumann compute engine and, therefore, suffer from the model's power inefficiencies.

Control-based von-Neumann architectures are tuned to execute a dynamic, sequential stream of instructions that communicate through explicit storage (register file and memory).

For GPGPUs, this means that each dynamic instruction must be fetched and decoded, even though programs mostly iterate over small static portions of the code. Furthermore, because explicit storage is the only channel for communicating data between instructions, intermediate results are thus transferred repeatedly between the functional units and the register file.

These inefficiencies dramatically reduce the energy efficiency of modern GPGPUs (as well as that of general-purpose von-Neumann processors). For example, recent GPGPUs spend only about 10-20% of their dynamic energy on computing instructions but spend up to 30% of their power on the instruction pipeline line and the register file.

SUMMARY OF THE INVENTION

Embodiments of the invention provide a single-graph multiple-flows (SGMF) execution model and architecture. The model targets coarse-grain reconfigurable fabrics (CGRFs) and is GPGPU-compatible, e.g., with the single-instruction multiple-threads (SIMT) model. The architecture employs thread pipelining and dynamic instruction scheduling to execute multiple data-parallel threads concurrently on a CGRF. Specifically, dataflow graphs are extracted from CUDA kernels and are mapped to the modified CGRF.

According to disclosed embodiments of the invention, the GPGPU-compatible architecture combines a CGRF with a dynamic dataflow execution model to accelerate execution throughput of massively thread-parallel code. This design differs from previous known CGRF designs, which favor single-threaded performance over multi-threaded throughput. Interestingly, the same factors that adversely affect the energy efficiency of graphics-processing units used for GPGPUs make a CGRF energy-efficient. A CGRF distributes the computation across a fabric of functional units. The compute operations (sometimes represented as nodes in dataflow graphs herein) are statically mapped to functional units, and an interconnect is configured to transfer values between functional units based on the graph's connectivity. These features make a CGRF energy-efficient and able to deliver good single-threaded performance (in comparison with von-Neumann processors). Distributed control and static instruction mapping obviate the instruction pipeline, and direct communication between functional units obviates a centralized register file.

A Single Graph Multiple Flows (SGMF) execution model disclosed herein combines pipelining and dynamic dataflow to extract thread-level parallelism in CGRFs. The model can yield enough thread-level parallelism to hide medium-latency events such as L1 cache misses.

There is provided according to embodiments of the invention a method of computing, which is carried out by providing an arrangement of processing units having interconnects therebetween, statically mapping compute operations to respective processing units, and configuring the interconnects according to requirements of the compute operations. Instructions that belong to a plurality of threads are associated with respective control tokens and thread identifiers, wherein the thread identifier of a first instruction identifies a first thread and the thread identifier of a second instruction identifies a second thread. The method is further carried out responsively to the control tokens by pipelining the instructions through the arrangement to the mapped processing units, dynamically rescheduling an order of execution of the first instruction with respect to the second instruction in one of the mapped processing units, and performing the compute operations responsively to the first instruction and the second instruction in the processing units in the rescheduled order of execution.

According to one aspect of the method, rescheduling is performed when the first instruction is unable to be executed by the one mapped processing unit.

Another aspect of the method includes representing the instructions as input tokens, and performing variants of the compute operations in one of the processing units responsively to the input tokens, generating result tokens, and transmitting the result tokens to another of the processing units.

According to a further aspect of the method, rescheduling is performed when the input tokens of the first instruction are not available to the one mapped processing unit.

In one aspect of the method, the arrangement includes a plurality of cores, wherein pipelining of the instructions is performed to respective cores. The method includes issuing control signals to the processing units of the cores to cause the cores to process instances of the compute operations concurrently.

Yet another aspect of the method includes grouping the threads into epochs, wherein rescheduling includes deferring execution in the one mapped processing unit of a newly arrived instruction belonging to a thread of one of the epochs until execution of previously arrived instructions belonging to threads of other epochs has completed.

Still another aspect of the method includes performing first compute operations of the first thread in a set of functional units, and upon completion of the first compute transmitting respective enabling tokens from the set of functional units to enable a second compute operation in another functional unit, and permitting the second compute operation of the first thread to be performed only after all the enabling tokens have been received by the other functional unit. The enabling tokens may be control tokens or data tokens.

An additional aspect of the method includes performing first and second compute operations in one of the threads with first and second functional units, respectively, transmitting a first enabling token from the first functional unit and a second enabling token from the second functional unit to a third functional unit, and performing a third compute operation in the one thread only after receipt therein of the first enabling token and the second enabling token in the third functional unit. The first and second enabling tokens may be control tokens or data tokens.

Yet another aspect of the method includes representing the one thread as a control data flow graph that has a join node, and configuring the third functional unit to effectuate the join node by executing a join operation in the one thread upon receipt of the first enabling token and the second enabling token.

In still another aspect of the method, the control data flow graph has a split node. The method includes configuring a fourth functional unit to effectuate the split node by executing a split operation in the one thread upon receipt of a result token of the third compute operation, wherein the split operation includes transmitting respective commit tokens to fifth and sixth functional units, and concurrently performing new compute operations of the one thread in the fifth and sixth functional units upon receipt of the commit tokens therein.

An additional aspect of the method includes representing one of the threads as a control data flow graph, making a determination that in the control data flow graph one path therethrough is longer than another path. Responsively to the determination, the method includes introducing a delay node in the other path and delaying compute operations of the one thread that occur in the other path.

According to a further aspect of the method, introducing a delay node includes introducing delay slots into the control data flow graph by a compiler, and equalizing a delay of different paths through the control data flow graph by adjusting numbers of the delay slots in the different paths.

A further aspect of the method includes representing one of the threads as a control data flow graph, providing a label node that collects the control tokens of diverging paths in the one thread, using the label node to select one of the diverging paths for execution, and transmitting poisoned control tokens to disable compute operations in the processing units that are represented by others of the diverging paths.

There is further provided according to embodiments of the invention a computer program product for carrying out the above-described method.

There is further provided according to embodiments of the invention a computing apparatus, including at least one core of interconnected processing units configured to execute a plurality of threads. The core includes compute units for executing computer instructions, load/store units, control units for executing control instructions, and special compute units for executing non-pipelined computing operations. A switch is implemented in each of the processing units for configurably establishing connections to other processing units in order to transfer values between the processing units across the connections, and respective private memories in the processing units. The private memories include configuration registers that store token routing information, operands and opcodes, and include reservation buffers for holding thread identifiers that are associated with in-flight data moving through the core, wherein the processing units are responsive to input tokens and control tokens, and are operative to transmit result tokens for use as the input tokens of other processing units via the connections. The processing units are operative to store state information and data pertaining to an incompletely executed compute operation while processing a new compute operation.

According to an additional aspect of the apparatus, the load/store units are disposed on a periphery of the core.

According to still another aspect of the apparatus, the core includes an internal grid of alternating columns of the compute units and the control units.

According to one aspect of the apparatus, the core includes an internal grid including a checkerboard arrangement of the compute units and the control units.

According to one aspect of the apparatus, the control units comprise a first-in-first-out memory buffer for holding tokens of thread instructions to cause a delay in execution thereof by others of the processing units.

According to another aspect of the apparatus, the switch is a crossbar switch.

According to another aspect of the apparatus, the switch is operative to connect the processing unit thereof to selected ones of eight nearest neighboring processing units.

According to yet another aspect of the apparatus, the switch is operative to connect the processing unit thereof to selected first processing units and to selected second processing units.

According to an additional aspect of the apparatus, the selected first processing units are eight nearest neighbors of the processing unit.

According to one aspect of the apparatus, the reservation buffers of the load/store units are programmed to hold input tokens of incomplete compute operations while other compute operations are in progress therein.

According to a further aspect of the apparatus, the load/store units comprise epoch logic circuitry operative to recognize a grouping of the threads into epochs, and to cause the load/store units to defer execution of a newly arrived instruction belonging to a thread of one of the epochs until execution of previously arrived instructions belonging to threads of others of the epochs has completed.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein:

FIG. 4, are a dataflow diagram of an aspect of an SGMF model, in accordance with an embodiment of the invention;

FIG. 10 is a schematic figure of an SGMF core, in accordance with an alternate embodiment of the invention;

FIG. 11 is a diagram illustrating an exemplary interconnect, in accordance with an embodiment of the invention;

FIG. 12 is a table describing evaluation of the SGMF architecture, in accordance with an embodiment of the invention;

DETAILED DESCRIPTION OF THE INVENTION

Figure 1:
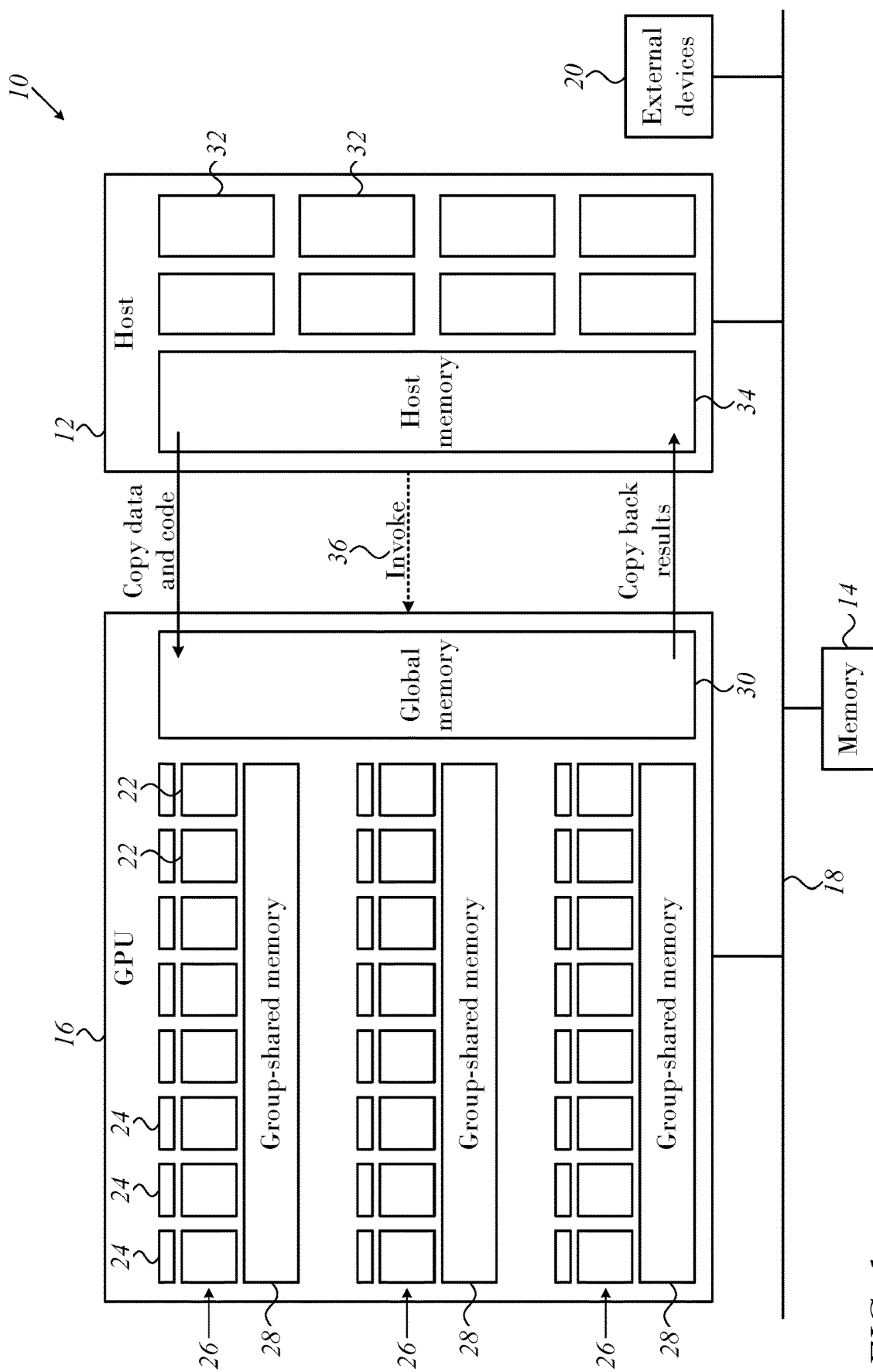
FIG. 1 is a block diagram of a system for general-purpose computation on graphics hardware, in accordance with an embodiment of the invention.

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

The various elements and embodiments of the invention can take the form of an entirely hardware embodiment, an entirely software embodiment or an embodiment containing both hardware and software elements. The invention may be implemented in software, which includes but is not limited to firmware, resident software, microcode, etc.

Although the present invention is described in a particular hardware embodiment, those of ordinary skill in the art will recognize and appreciate that this is meant to be illustrative and not restrictive of the present invention. Those of ordinary skill in the art will further appreciate that a wide range of computers and computing system configurations can be used to support the methods of the present invention, including, for example, configurations encompassing multiple systems, the internet, and distributed networks. Accordingly, the teachings contained herein should be viewed as highly "scalable", meaning that they are adaptable to implementation on one, or several thousand, computer systems.

Furthermore, elements of the invention can take the form of a computer program product accessible from a computer-usable or computer-readable medium providing program code for use by or in connection with a computer or any instruction execution system. A computer usable or computer readable medium can be a non-transitory electronic, magnetic, optical, electromagnetic, infrared, or semiconductor system (or apparatus or device).

Definitions.

The term "thread" as used herein is a sequence of instructions that can be executed by a computer processor or a processor emulator, wherein the sequence can be managed independently of other sequences of instructions of the process. Threads of a process may share memory resources, instructions and state information with other threads of that process.

The terms "kernel" and "GPU kernel" refer to portions of a computer program that are intended to be executed by a GPU or another accelerator processor. A kernel is typically represented in programming language code, machine code or control flow graphs.

The terms "CDFG boundary node" and "CDFG boundary unit", when applied to functional units arranged in a grid or fabric, refers to a node that requires no input tokens to generate a result token. Hence, it conceptually resides on the boundary of the CDFG. When a boundary node is mapped to a functional unit, it is referred to as a boundary unit.

The term "coarse-grain" as applied to a grid, means that the grid is composed from an array of functional units that perform any number of complex operations or calculations (unlike a fine grained array that is composed of gates or LUTs that perform simple operations).

The term "token" refers to a message that is typically communicated between functional units of a grid. The term may be qualified by its intended origin or destination with respect to a functional unit, e.g., "input token". Substitute terminology may be used to express functionality of a token, e.g., "result token", "commit token", and "control token". Additionally or alternatively, the terminology may be substituted or qualified to describe the content of a token, e.g., "data token", "data input token". In cases of substituted or qualified terminology, the meaning will be apparent from the context.

In a rectangular grid composed of an arrangement of elements, wherein one element has at least one point of contact with another element, the other element is a "nearest neighbor" of the one element.

"Eight nearest neighbors" (8-NN). For an element A in a rectangular grid, a neighbor element is any element that is directly adjacent horizontally, vertically or diagonally. We enumerate the eight nearest neighbors of an element A as West (W), North-West (NW), North (N), North-East (NE), East (E) South-East (SE), South (S) and South-West (SW). The terms W, NW, N, NE, E, SE, S and SW are used arbitrarily herein to distinguish the relationships among the neighbor elements. These terms have no physical meanings with respect to the actual configuration of the grid.

A "tile" is a basic component (typically a computational component) that is replicated and laid out in a repeating pattern to compose a processor. Processors and architectures that are built in this manner are referred to as "tiled". The components herein to which the tile refers include compute units, control units and LDST units.

"Static mapping" and "static configuration" refer to a mapping or configuration that does not change during the execution of a series of compute operations represented by a particular CDFG.

Overview.

Turning now to the drawings, reference is initially made to FIG. 1, which is a high-level block diagram of a system 10 for general-purpose computation on graphics hardware, in accordance with an embodiment of the invention. The system 10 includes at least one host processor 12 coupled directly or indirectly to memory elements 14 elements and to a graphics-processing unit 16 (through a system bus 18. The graphics-processing unit 16 is typically tiled, and is described below in further detail. Moreover, although a single graphics processing unit is shown in FIG. 1, this is by way of example and not of limitation. Any number of graphics processing units may be incorporated in the system 10. The memory elements 14 can include local memory employed during actual execution of program code, main storage and cache memories, which provide temporary storage of at least some program data or code in order to reduce the number of times code must be retrieved from bulk storage during execution.

Input/output (I/O) devices 20 (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Shown in FIG. 1 is a typical data flow between the processor 12 and graphics-processing unit 16. The graphics-processing unit 16 is comprised of a plurality of processing elements 22, each typically having a private cache or memory 24. The processing elements 22 may be organized in groups 26, which may each have a group shared memory 28. Specializations of the processing elements 22 are discussed below. The graphics-processing unit 16 may include a global memory 30. Although the graphics-processing unit 16 efficiently performs computing tasks relating to graphics images, it may be programmed to perform computations unrelated to graphics. While a particular architecture is shown in the example of FIG. 1, the principles of the invention apply to any processor that executes massively parallel programs on a coarse-grain reconfigurable architecture.

The processor 12 may have any architecture known in the art. In the example of FIG. 1, the processor 12 is a multicore processor of the sort found in current personal computers, having a plurality of core units 32 and a host memory 34 in some known configuration, e.g., one or more caches.

In a typical operation data, such as a GPU kernel comprising code and data is copied from the processor 12 to the global memory 30. The processor 12 than sends a command signal 36 that invokes the processing elements 22, causing the processing elements 22 to operate on the compute kernel in a parallel fashion. Results are then copied back from the graphics-processing unit 16 to the processor 12 or shared with the processor 12. Additionally or alternatively, the results may be communicated to one or more of the devices 20, for example a display (not shown).

The graphics-processing unit 16 is embodied as a single-graph multiple-flows (SGMF) core composed of a grid of interconnected functional units onto which GPU kernels are mapped. An SGMF processor can be composed of multiple SGMF cores. The SGMF core employs a tagged-token dynamic dataflow model to execute multiple threads concurrently.

The following exemplary types of tokens contain information and thread identifiers: data tokens, control tokens and poisoned token. For example, as summarized in Table 2, data tokens contain variable values, e.g., integers or floating point. Control tokens contain control information that helps to preserve the execution order of the operations. Poisoned tokens contain a pre-determined value that indicates that no operations should be done on it. If a tile that should perform addition gets a poisoned token on one of its inputs, the addition will not be performed, and another poisoned token will be sent to the outputs of the tile.

TABLE 2

| Data token | Control token | Poisoned token |
| --- | --- | --- |
| Contains data (floating point or integer) | Contains control data: true, false from condition nodes; e.g., "commit token" commits to memory operations | Contains unique bit sequence that indicates that no operation should be performed |

According to this model, every thread is tagged, and the tag is attached to all in-flight data values associated with the thread. Tagging the values transferred between functional units (one or more of the processing elements 22) allows threads to bypass memory-stalled threads and execute out of order, while data-dependencies inside each thread are maintained. This increases overall utilization by allowing unblocked threads to use idle functional units.

SGMF cores benefit from two types of parallelism: a) pipelining the instructions of individual threads through the CGRF; and b) simultaneous multithreading (SMT), achieved by dynamically scheduling instructions and allowing blocked threads to be bypassed. Furthermore, the model enables the processor to fetch and decode instructions only once, when the program is loaded, and provides for directly communicating values between functional units. We show that the dynamically scheduled spatial design is more energy-efficient than von-Neumann-based GPGPUs, for example, consuming about 50% less energy than the Nvidia Fermi™ design.

Execution Model: Spatial Computing with Dynamic Dataflow.

The SGMF execution model adapts a CGRF to deliver massive thread-level parallelism, in order to support the CUDA and OpenCL programming models. The reconfigurable grid is composed of compute units (similar in design to CUDA cores), control units, load/store (LDST) units and special compute units (which compute long latency operations such as division and square root). All units are interconnected using a statically routed interconnect. A specialized compiler, referred to herein as the SGMF compiler, breaks CUDA/OpenCL kernels into dataflow graphs and integrates the control flow of the original kernel to produce a control data flow graph (CDFG) that includes control tokens.

Including control tokens into the graph eliminates the need for centralized control logic, because the control tokens are passed through the interconnect as arguments to the compute units. Control tokens are messages sent between the compute units to indicate which LD/ST operations should execute. These messages assure that only valid data is sent to memory, so that the results of the computation are consistent with those of a sequential execution of the code.

The CDFG is mapped to the grid and the interconnect is statically configured to match the CDFG connectivity.

Pipelined Parallelism.

Functional units in the grid execute (or fire, in dataflow parlance) once their input operands are ready, i.e., the input tokens needed for execution have all arrived, regardless of the state of other functional units. The result of a compute operation conducted by a functional unit is sent as a result data token to a destination node, typically another functional unit that may be represented as a destination node on a CDFG. The destination node can be a compute unit, control unit, LD/ST unit, or a special compute unit. In other words, a functional unit receives both data and control tokens from its predecessor nodes in a CDFG and sends data and control tokens to its successor nodes.

In the destination unit, the result data token is treated as an input token. The functional unit that produced the result data token is then available to process new input tokens, which may belong to the same or a different thread. This enables pipelining of multiple threads through the grid—different threads execute at different levels of the dataflow graph at the same time. The number of threads that can execute in parallel using pipelining is proportional to the length of the critical path in the CDFG.

Thread execution begins at the CDFG boundary units of the grid, with units that represent constants in the CDFG.

The CDFG boundary units feed other functional units, which consist primarily of compute and load/store (LDST) units. The CDFG boundary units initiate the creation of new threads by sending tokens with predetermined values to respective destination units. In this manner, new threads can be introduced into the grid at every cycle during which their destination nodes can receive them.

Figure 2:
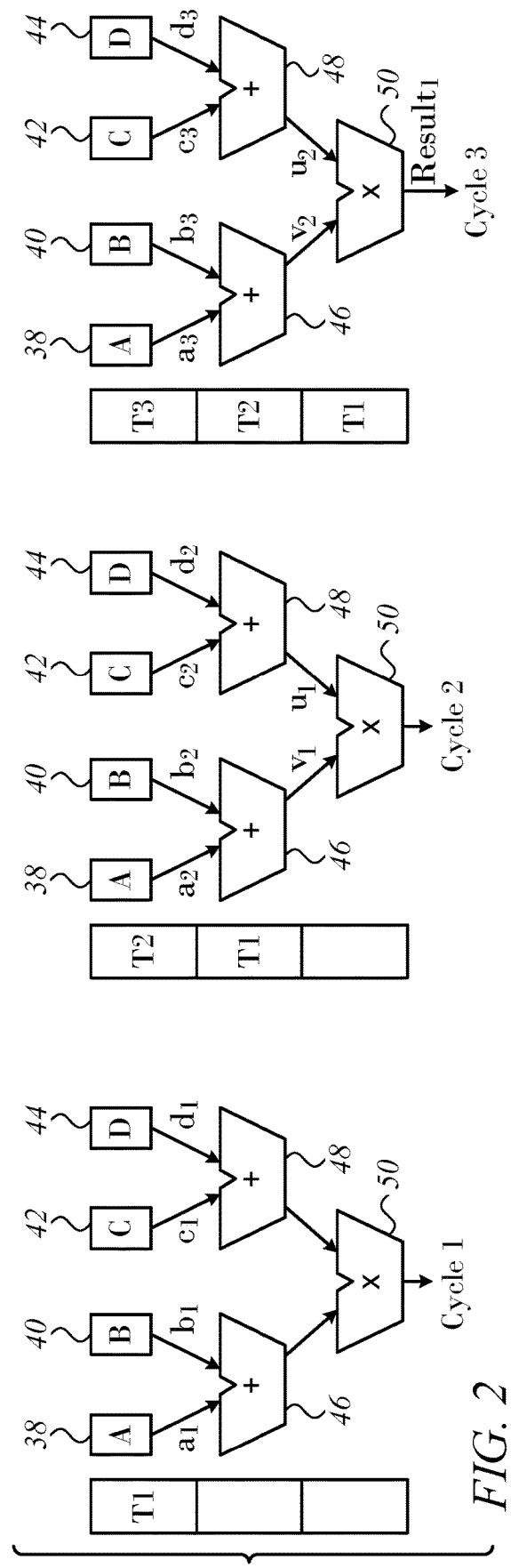
FIG. 2 is a data flow diagram illustrating thread pipelining, in accordance with an embodiment of the invention.

Reference is now made to FIG. 2, which is a data flow diagram illustrating thread pipelining in accordance with an embodiment of the invention. Three cycles are shown. In the first cycle, constant units 38, 40, 42, 44 send the tokens that correspond to thread #1, namely tokens a1, b1, c1, d1. These tokens are processed by destination compute units 46, 48 in the second cycle, at which time the constant units 38, 40, 42, 44 can send the tokens associated with thread #2: tokens a2, b2, c2, d2 to the compute units 46, 48. Finally, in the third cycle once the tokens of thread #1, tokens u1 and v1, reach multiplication unit 50, the constant units 38, 40, 42, 44 can send tokens a3, b3, c3, d3 for thread #3 to the compute units 46, 48.

Importantly, input tokens may arrive at the units at different times. We therefore add token buffers to each functional unit (node), in which received tokens wait until all the input tokens required for an operation are available, and the operation can execute.

Dynamic Dataflow.

Thread pipelining requires that, in the common case, units in the CGRF be able to consume and process new tokens at every cycle. The units must therefore either incur a single-cycle processing latency or be fully pipelined. Some operations, however, cannot provide these guarantees. These include memory operations and compound, non-pipelined computations (division and square root operations). We therefore employ dynamic dataflow to relax this restriction.

Non-pipelined operations, and in particular those whose latency is unpredictable, may severely degrade the utilization of the SGMF core. For example, memory operations might stall on cache misses and block all threads in the pipeline. Furthermore, compound arithmetic operations such as division (both integer and floating point) and square root computation are inherently non-pipelined. Moreover, their latency is not fixed and depends on the operands. This section describes how the SGMF execution model uses dynamic dataflow to tolerate long latency operations by allowing stalled threads to be bypassed by ready ones.

The SGMF execution model employs dynamic dataflow semantics to schedule instructions dynamically in the functional units. Dynamic dataflow, and specifically tagged token dataflow, dynamically reorders instructions coming from different threads that are to be executed by individual functional units. Such reordering occurs responsively to non-availability of input tokens of instructions of one of the threads (in a manner that resembles simultaneous multi-threading (SMT)). Reordering may also occur even though the input tokens are available to the functional unit but the instruction is blocked or stalled for other reasons, e.g., incomplete memory operations or non-pipelined arithmetic instructions. This enables instructions in one thread to bypass blocked instructions in other threads. Threads are thereby allowed to execute out of order to maintain the overall grid utilization.

We demonstrate thread bypassing using LDST units, which are conventional and can be configured to perform the functions described herein. The same principles are applied in special compute units, which handle non-pipelined arithmetic operations and are described below.

Figure 3:
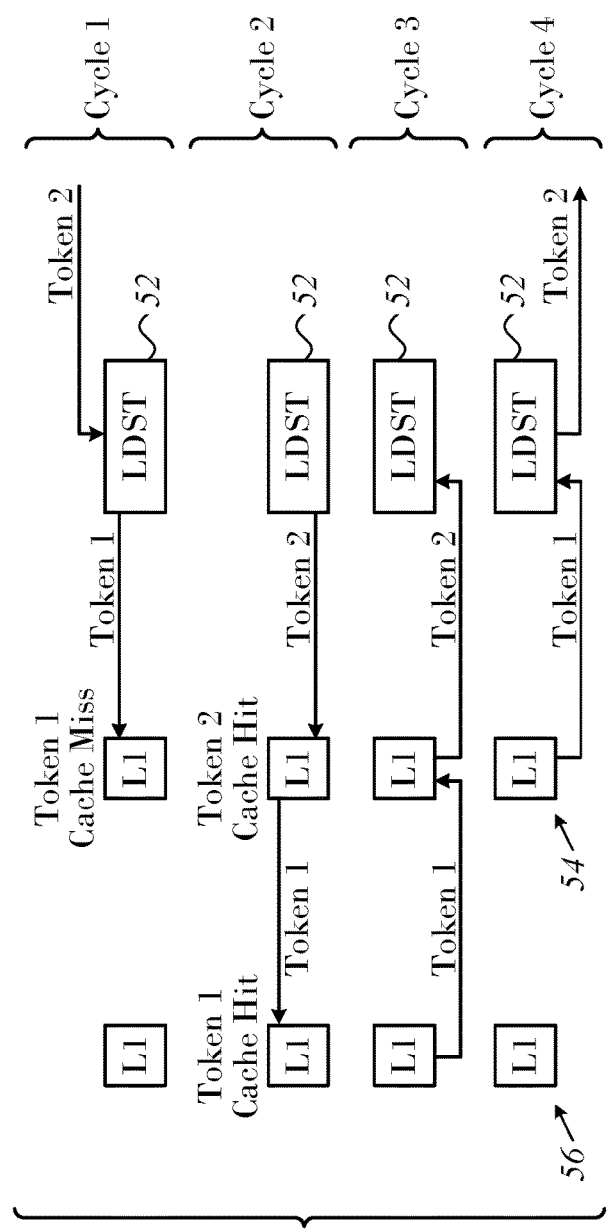
FIG. 3 is a data flow diagram illustrating token flow, in accordance with an embodiment of the invention.

Reference is now made to FIG. 3, which is a data flow diagram illustrating token flow in accordance with an embodiment of the invention. Four cycles are shown. LDST units may return result tokens out of order. In the cycle 1, a load operation is executed by LDST unit 52 on behalf of thread #1, which experiences a cache miss at a cache level 54 (indicated by movement of token 1 from the LDST unit 52 to cache level 54.

The memory operation then waits until data is retrieved from next cache level 56. During that time, the LDST unit can execute a load operation on behalf of thread #2, which hits in the cache in cycle 2, indicated by movement of token 2 from LDST unit 52 to cache level 54. The load operation for thread #1 is performed in cache level 56, shown by movement of token 1 from cache level 54 to cache level 56. In cycle 4, the retrieved memory value for the thread #2 is thus sent to a destination node (arrow 58) before the value of thread #1 becomes available to its destination node. A similar scenario may also occur with hits to a non-uniform cache architecture (NUCA).

Since tokens may arrive out of order, CGRF units need to be able to match input tokens associated with a specific thread. Each thread is therefore associated with a unique thread identifier (TID), and tokens are tagged with a respective TID. To obviate associative tag matching in the functional units, the token buffer is implemented as a direct-mapped structure and used as an explicit token store. Token buffers are indexed by the lower bits of the TID, and a functional unit can only execute if all of a thread's input tokens are available in its respective token buffer entries.

Figure 4A:
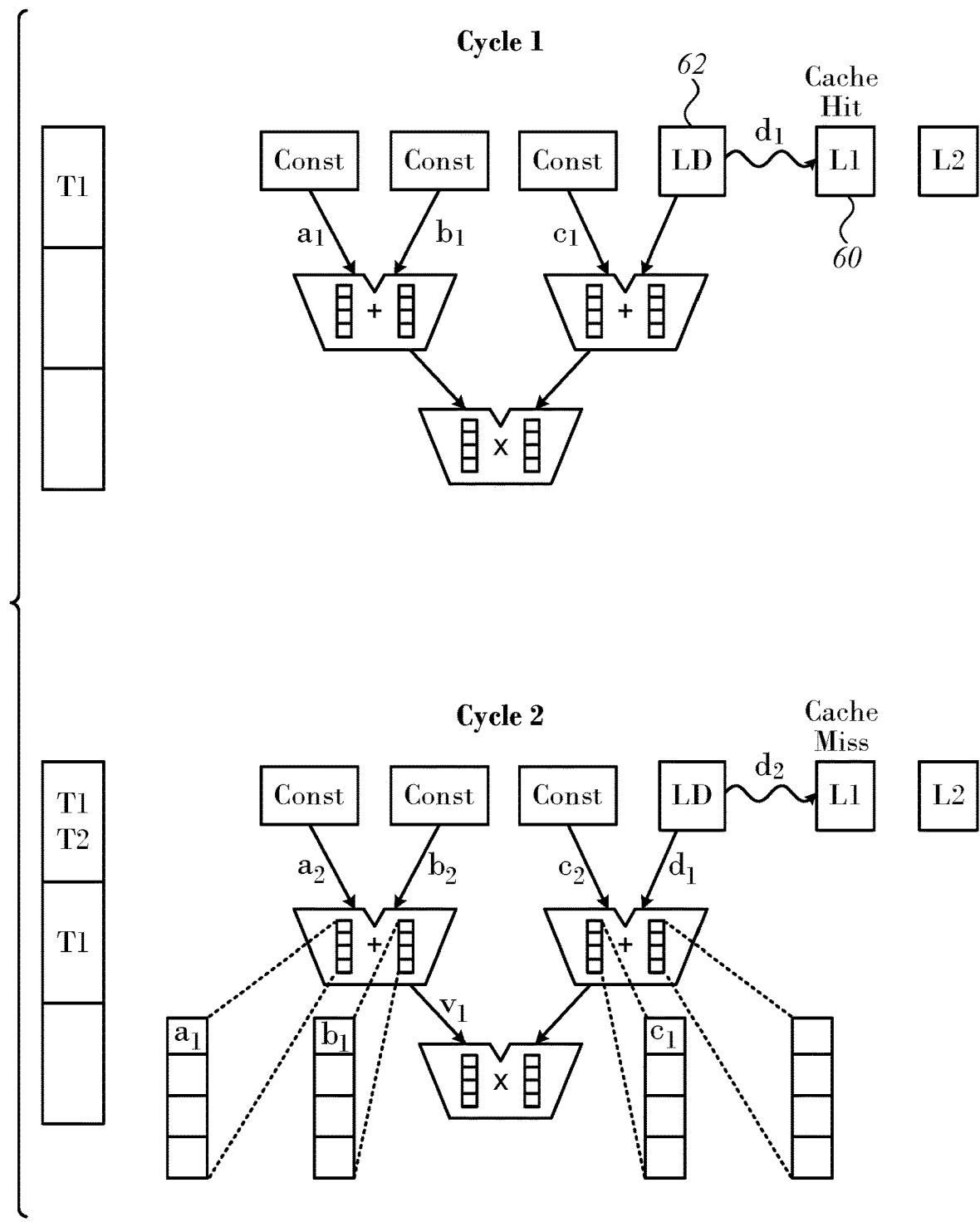
FIGS. 4A and 4B, collectively referred to herein is
Figure 4B:
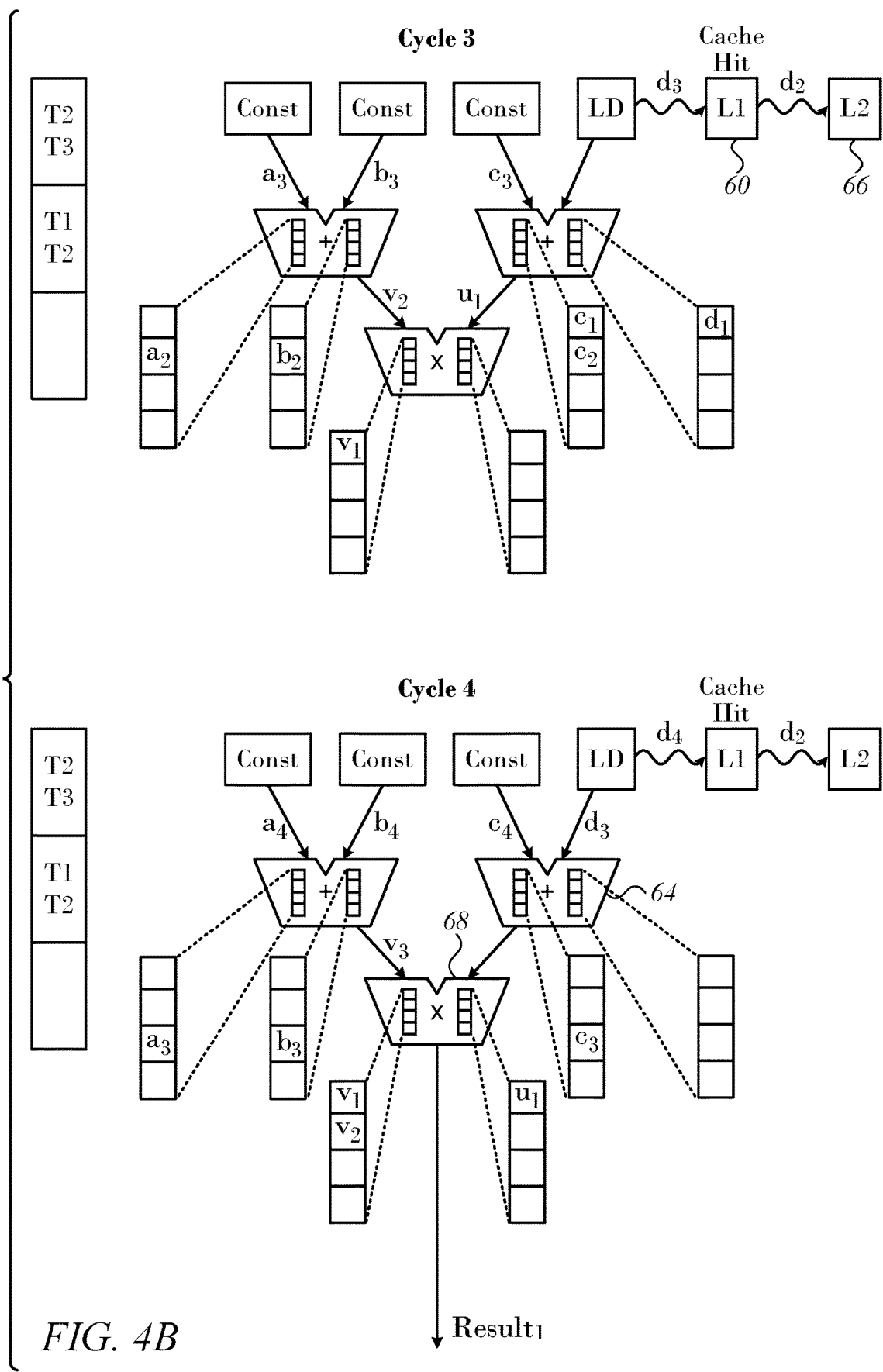

Reference is now made to FIG. 4, which is a dataflow diagram of an aspect of the SGMF model, in accordance with an embodiment of the invention. FIG. 4 illustrates thread pipelining with combined out of order thread execution. The scenario is similar to that shown in FIG. 2, but with out of order execution. While thread #1 hits in L1 cache 60 and does not stall in LDST unit 62 (cycle 1), thread #2 misses and stalls (cycle 2). Nevertheless, thread #3 hits (cycle 3) and its token is sent to adder 64 (cycle 4), while token d2 form thread #2 is moved from L1 cache 60 to L2 cache 66. Thread #3 will thus reach multiplication node 68 in the following cycle (not shown), and the execution of thread #3 will bypass that of the thread #2.

The amount of thread-level parallelism extracted using dynamic dataflow is proportional to the size of the token buffer. Our RTL implementation, for example, described below, stores tokens for eight threads. The overall thread-level parallelism available using the SGMF execution model is a multiplication of the thread-level parallelism available using each method—i.e., critical path length×token store size. For example, the SGMF model can manage up to 24 concurrent threads for the graph in FIG. 4, whose critical path is length 3, when using token buffers that hold 8 threads.

Design Considerations.

A CGRF designed for thread-level parallelism is different from one designed for accelerating single-thread performance. In this section, we highlight the key challenges when designing a CGRF tuned for massive thread-level parallelism The latency of memory operations is not predictable in the presence of caches, and responses from the memory system may arrive at LDST units in an order that differs from the order in which the requests were issued. A multi-threaded CGRF must correctly handle out of order memory responses to guarantee functional correctness and prevent deadlocks.

Correctness: Mapping Memory Responses to Threads.

Single-threaded CGRFs carry no ambiguity pertaining to the identity of a value returned from memory. A single static instruction is mapped to each LDST, which only executes one thread. A LDST unit can thus directly forward a memory response to its destination functional units. In a multi-threaded CGRF, memory responses must be associated with their issuing thread, or the functional correctness will be impaired (e.g., thread B will receive a memory value destined for thread A).

We add a reservation buffer to each LDST unit, which stores the TID of each in-flight memory access. The reservation buffer is then used to associate each memory response with its issuing thread. To prevent the reservation buffer from limiting the attainable thread parallelism, we assign it the same number of entries as in the token buffer.

Deadlocks: Thread Bypassing and Finite Token Buffers.

The unpredictability of memory latencies coupled with the finite size of token buffers can deadlock the execution of multiple threads. Deadlocks are a key limitation of dynamic dataflow.

Figure 5:
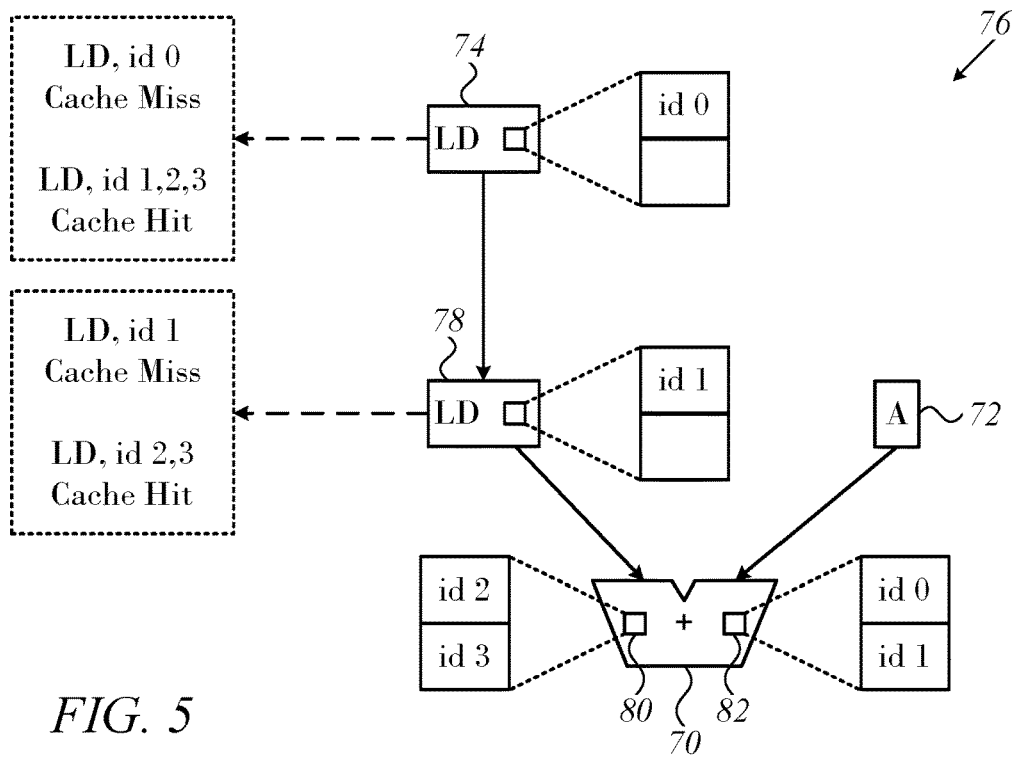
FIG. 5 is a dataflow diagram illustrating a pipeline segment, in accordance with an embodiment of the invention.

Reference is now made to FIG. 5, which is a dataflow diagram illustrating a pipeline segment, in accordance with an embodiment of the invention. An adder 70 takes its input from an addition involving a double memory indirection with a constant 72, e.g., an array[i][j]+5. In the example, thread #0 reaches a first LDST unit 74, misses in L1 cache 76, and at least the thread identifier and the memory transaction identifier of the input token pertaining to thread #0 occupies one of the entries in its reservation buffer until the memory value is returned. Then, thread #1 clears the first LDST unit 74 but stalls on second LDST unit 78. While threads #0 and #1 are stalled, threads #2 and #3 both clear the two LDST units (hit in the L1 cache).

Their tokens thus reach the adder 70 and wait in its left input's token buffer 80. However, the right input's token buffer 82 is fully occupied with the tokens for threads #0 and #1 (sent by the constant unit), and the system deadlocks.

To prevent such deadlocks, we introduce the concept of thread epochs. The TIDs are sequentially partitioned into epochs, each grouping a number of threads in accordance with the size of the token buffer. In the example of FIG. 5, the token buffers consist of two entries. The first thread epoch will include TIDs #0 and #1; the second epoch will include TIDs #2 and #3, and so on. Thread epochs are used by the LDST units to avoid deadlocks by throttling thread parallelism. Specifically, newly arriving instructions belonging to threads of one epoch will not be processed by a LDST unit before all previously arrived instructions belonging to threads of other epochs have graduated from the LDST unit.

In FIG. 5, we see that thread epochs prevent the deadlock since threads #2 and #3 will not be processed by the LDST unit 74 before both threads #0 and #1 have graduated from the pipeline segment. Both LDST units 76, 78 cooperate to guarantee that threads #0 and #1 will reach the adder 70 before threads #2 and #3 and the deadlock will be avoided.

The implementation of thread epochs adds minimal logic to the LDST units but, as shown above, is quite beneficial to the implementation of the SGMF model.

Virtually Pipelining Non-Pipelined Arithmetic.

Non-pipelined arithmetic operations may greatly hinder performance of a pipelined CGRF. Specifically, we address three types of non-pipelined operations: integer divisions, floating point divisions and square root computations. For brevity, the text only refers to floating-point division, but the mechanisms described apply to the other two types.

We use dedicated special compute units to process non-pipelined operations. Each special compute unit contains multiple floating-point divider blocks and can therefore compute multiple floating-point divisions at any given time. Like the LDST unit, the special compute unit includes a reservation buffer to track in-flight operations. Whenever the unit identifies matching input tokens in its token buffers, it stores the originating TID in an available slot in the reservation buffer and issues the floating-point division operation to an available divider. When a computation finishes, the result is tagged with its associated TID and forwarded to a destination node.

This design also allows instructions to complete out of order executions. Since the effective latency of floating-point division depends on the input operands, one thread's instruction may complete before that of an earlier thread. The tagged token dynamic dataflow model allows the result associated with a younger thread to bypass older ones. Consequently, much like LDST units, the reservation buffer enforces thread epochs to prevent deadlocks.

The special compute units hardly increases the overall amount of logic in an SGMF core compared to that of a GPGPU streaming multi-processor. Since each CUDA core already includes a floating-point division block, aggregating the blocks in the special compute units simply reorganizes existing logic. The only logic added to the group of dividers includes the reservation buffer, token buffers and a multiplexer/demultiplexer (mux/demux), which connect the dividers. Maintaining the area constraint, however, limits the number of special compute units that can be implemented in the SGMF core. For example, if we design the unit to include 8 dividers, and assume that a Fermi streaming multi-processor has 32 CUDA cores, the SGMF fabric can only contain 4 special compute units.

The special compute units allow the compiler to assume that all instructions are pipelined. The compiler can thus map a static, non-pipelined instruction to a special compute unit. In turn, the special compute unit consumes new input tokens in nearly every cycle by distributing their computation to one of its multiple computational blocks.

Intra- and Inter-Thread Memory Ordering.

The data parallel CUDA and OpenCL models leave it to the programmer to partition code into independent threads. However, memory operations executed by individual threads may be interdependent, especially in the presence of memory aliasing. Therefore, an SGMF implementation should allow memory operations issued by different threads to execute out of order, but it must guarantee that the memory operations of each thread not violate intra-thread memory dependencies.

Figure 6:
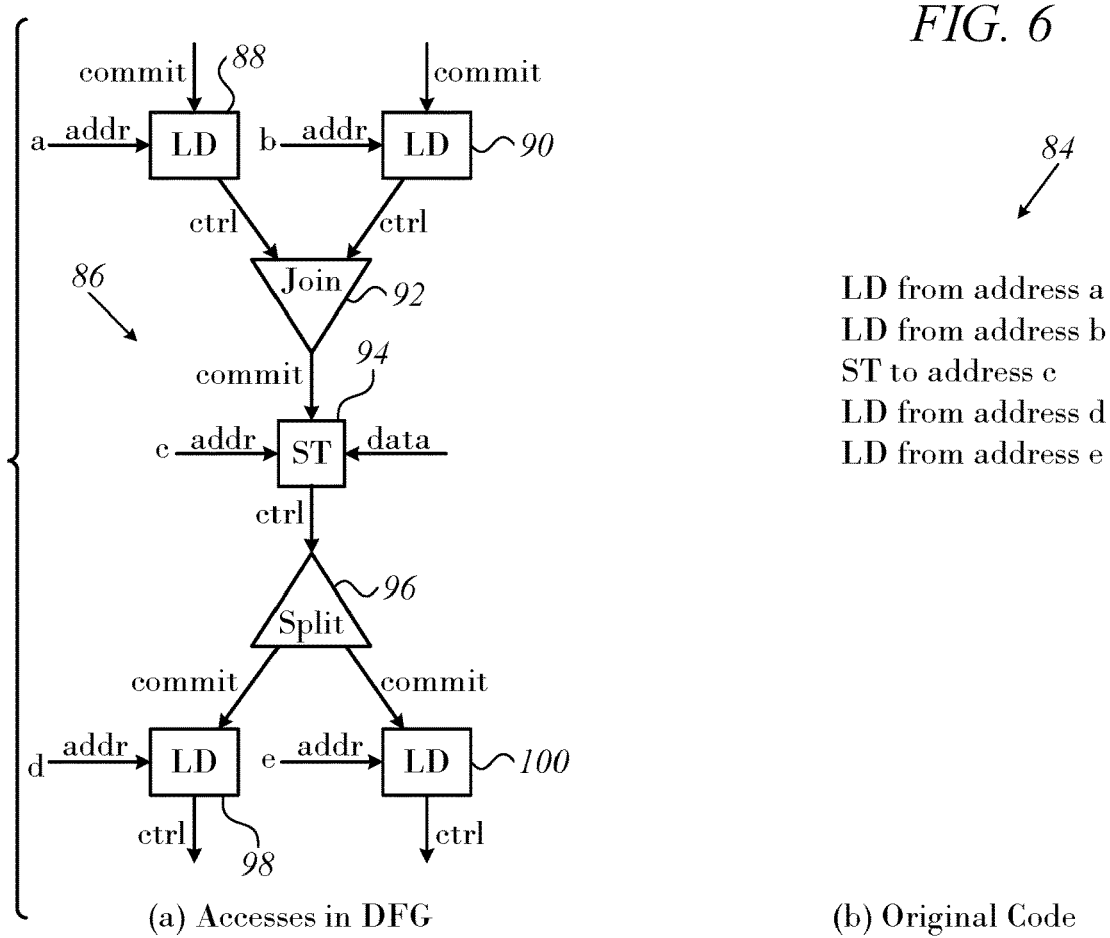
FIG. 6 is a control data flow graph implementing a code listing, in accordance with an embodiment of the invention.

Nevertheless, loads may still be reordered if they do not violate loadstore dependencies. Reference is now made to FIG. 6, which is a control data flow graph implementing a code listing, in accordance with an embodiment of the invention. As a convenience of expression, nodes are sometimes said to perform actions in the discussion of FIG. 6 and other discussions of CDFGs herein. However, it will be understood that the actions are actually executed by processing units that are represented by the nodes.

In the pseudocode presented in listing 84 at the right of the figure, the first two loads can be reordered, as long as they complete before the following store is issued. Conversely, the last two loads can also be issued concurrently, as long as they are issued after the preceding store completes.

To preserve memory ordering within a thread, we add control edges to the CDFG that chain memory operations. LDST units must send control or data tokens that enable subsequent memory operations from the same thread to be issued. Importantly, all tokens are tagged by the respective thread's TID, so parallelism between threads is still supported. Furthermore, the compiler can inject join operations to collect tokens from multiple LDST units and thus enable read parallelism.

A CDFG 86 results from the pseudocode in listing 84. The CDFG 86 preserves read-write ordering yet still supports concurrent load operations. Specifically, LDST nodes 88, 90 associated with the first two loads send enabling control or data tokens to a join operation 92. The join operation 92 sends a tagged enabling control or data token to a following LDST node 94 only after it receives matching enabling control or data tokens from both preceding LDST nodes 88, 90. Inversely, upon receipt of a result token from the LDST node 94, a split node 96 transmits commit tokens. The commit tokens are control tokens that serve as input data tokens to LDST units 98, 100, and enable the last two load operations to execute concurrently in LDST units 98, 100.

The join operation 92 and split node 96 require additional units in the CGRF. However, as discussed below, these operations are implemented using dedicated control units.

Balancing Graph Paths by Injecting Delays.

Pipelining multiple threads through the graphs requires that diverge-merge paths (hammock paths) be of equal length. The reason is that if such paths contain different numbers of nodes, they can only pipeline different numbers of threads, thus degrading utilization (akin to pipeline bubbles). Importantly, this problem is not unique to diverging control paths but also affects diverging computation paths.

Figure 7:
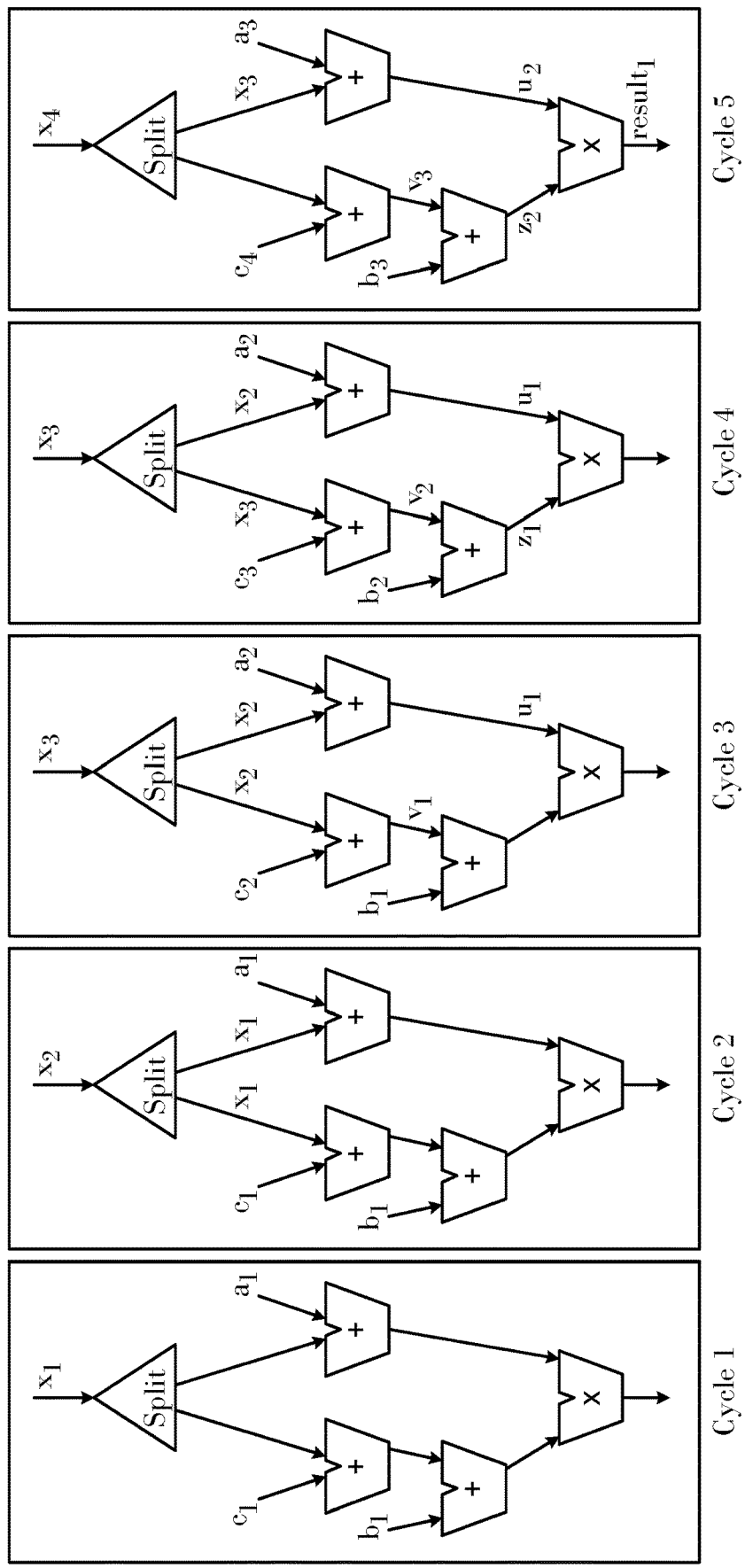
FIG. 7, which is a graph illustrating treatment of functional unit stall due to an imbalance in path lengths, in accordance with an embodiment of the invention.

Reference is now made to FIG. 7, which is a graphic illustration of treatment of functional unit stall due to an imbalance in path lengths, in accordance with an embodiment of the invention. FIG. 7 presents the graph for the computation of the expression $(a+x)*(b+c+x)$. The left path through the graph represents the computation of $(b+c+x)$ and includes three nodes. The right path, for the computation of $(a+x)$, includes two nodes. When pipelining threads (or in-flight tokens) flow through this graph, the SGMF processor will only complete a thread computation every other cycle.

We address this problem by introducing conceptual delay nodes to equalize paths through the graph. In effect, we add small skid buffers (implemented as FIFOs in the control nodes described below). The skid buffers are configured at compile and map time to pipeline a specific number of in-flight tokens (chaining control nodes, if needed, to generate larger buffers), thereby equalizing the lengths of diverging paths.

Embedding Control in the Dataflow Graph.

Delay injection can be accomplished in two phases:

Pre-mapping: During compilation, the CDFG is generated and the compiler injects delay slots by introducing control nodes into the graph Post-mapping: Mapping the CDFG to the CGRF may affect the lengths of some of the paths (adjacent graph nodes may be mapped to non-adjacent functional units). The compiler then tunes the exact number of delay slots to be used in the injected control nodes to equalize the delay of the paths.

In our implementation of control code, both code paths are mapped to the CGRF and control tokens are used to enable only one path. However, since our design targets thread-level parallelism rather than accelerating a single thread, some of the design tradeoffs related to dataflow predication can be handled in a somewhat different manner.

In a design that targets single-thread performance, the results of a branch instruction should ideally be propagated directly to each instruction predicated by the branch. However, this strategy yields high graph connectivity and edge fan-outs. In designing for thread-level parallelism rather than single thread performance, we add label nodes that govern the diverging code paths. A label node collects the control tokens of all preceding branches and therefore aggregates all the conditions that dominate the execution of the basic block it controls. In addition, Static single assignment form (SSA) phi nodes are translated into multiplexers, whose selection token is governed by the label node and whose data tokens are received from the nodes generating its possible values on both control paths.

Importantly, loads and stores on non-taken code paths must be disabled, so that false accesses will not be sent to the memory system. The non-taken label node must thus send a poisoned control token to its subordinate LDST node. This process is simplified since load and stores are chained (as described above). Consequently, the control nodes need only send values to the first LDST node in the chain and the control token is forwarded along the chain.

Figure 8:
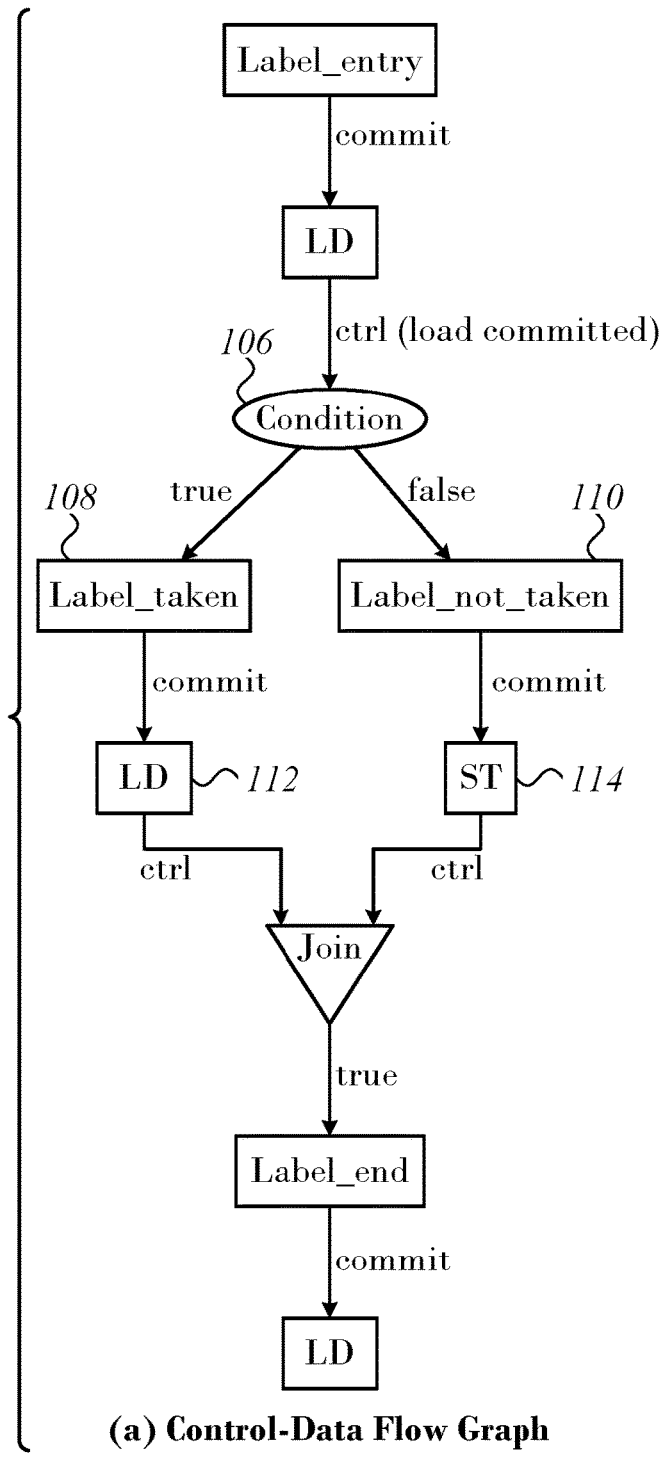
FIG. 8 is a control dataflow graph implementing a code listing, in accordance with an embodiment of the invention.

Reference is now made to FIG. 8, which is a control dataflow graph implementing a code listing, in accordance with an embodiment of the invention. Code listing 102 demonstrates divergent code, which is represented as a CDFG 104. Ellipses in the code listing 102 indicate code without control or memory operations. The CDFG 104 includes a condition node 106 that outputs the values True or False and label nodes 108, 110 for each code label. As depicted, the label nodes 108, 110 propagate their control tokens down the code chains to enable/disable the relevant memory operations in LDST units 112, 114.

Embedding control information into the dataflow graph is required for correct execution, but may also increase the number of nodes and edges. As discussed below, an SGMF processor includes dedicated control nodes to implement the label functionality illustrated in FIG. 8.

Large Kernels and Loops.

Since the size of the reconfigurable grid is finite, kernels may need to be partitioned into smaller kernels. Specifically, this is needed if kernels require more functional units than available in the grid or cannot map due to the limited grid connectivity.

Kernel partitioning splits a larger kernel into multiple smaller ones that are executed sequentially: a) all threads execute the first kernel, storing their intermediate values to memory; b) the SGMF processor reconfigures the grid to run the next kernel; c) all threads execute the second kernel; and d) the processor repeats steps b and c as needed.

Loops are handled in a similar manner. A kernel that contains a loop is split into an initialization kernel that includes all the code that precedes the loop, a loop kernel and an epilogue kernel that consists of the code that follows the loop.

The three kernels are executed in sequence, as described above, with one difference: the loop kernel is executed repeatedly according to the number of loop iterations. Note that loop iterations execute sequentially for each thread and thereby do not violate loop-carried dependencies. Furthermore, memory operations in the loop kernel are predicated on a thread basis (similar to vector masks), allowing threads to execute different numbers of iterations.

The SGMF Architecture.

The SGMF processor is designed as a multi-core architecture that comprises multiple SGMF cores. Each SGMF core is a CGRF composed of interconnected heterogeneous units.

The memory system of the SGMF processor is similar to that of the Nvidia Fermi processor. Each SGMF core is connected to a private, banked L1 cache. A banked L2 cache is shared among all cores. The main memory is composed of a banked, multi-channel GDDR5 DRAM.

Reservation and Operand Buffers.

The SGMF architecture does not require a central register file (RF). Since no temporal data is saved, the large RF can be replaced with small buffers that are spread across the different units. Two types of buffers are used: a) token buffers in each unit that store input tokens (operands) until all tokens of the same thread have arrived; and b) reservation buffers that track in-flight memory operations. These buffers enable thread reordering by allowing memory values to flow into the fabric out of order.

When a load command is sent to the memory system, the issuing thread's TID is saved in the reservation buffer. When the data returns from memory, it is tagged with its thread's TID and sent to the next unit. TIDs are grouped into epochs, which limit out of order execution of memory operations to groups of threads and thereby guarantee buffer space in the following level of the graph. Inside each unit, threads that belong to the same epoch are served in a FR-FCFS policy. Once all the tokens from the current epoch have been sent, the epoch counter is advanced by one, and the tokens from the next epoch can be sent on.

The number of entries in the token buffers and reservation buffers is set to 8. This number is based on design space exploration (not shown) that studied the power/performance tradeoff of between thread-level parallelism provided by larger buffers and the power they incurred. The total size of buffers in an SGMF core is therefore about 9 Kbytes. For comparison, the size of the RF in each Nvidia Fermi streaming multiprocessor (SM) is 48 Kbytes. The total buffer space required by the SGMF core to store intermediate values is thus only about 15% of that required by the Nvidia Fermi SM.

The SGMF Core.

Figure 9:
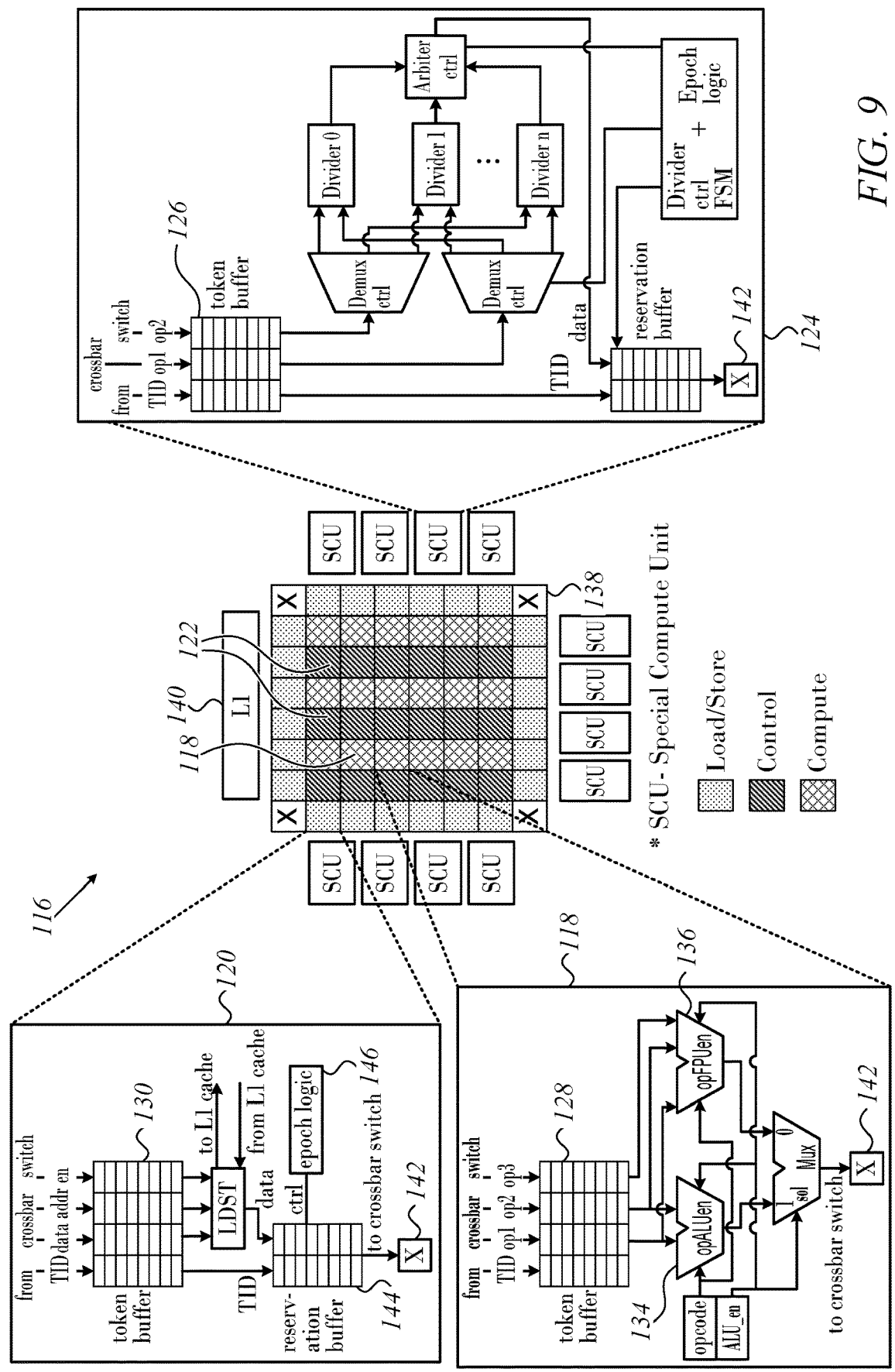
FIG. 9 is a schematic figure of an SGMF core, in accordance with an embodiment of the invention.

Reference is now made to FIG. 9, which is a schematic figure of the hardware organization of an SGMF core 116, in accordance with an embodiment of the invention. Each SGMF core is composed of four types of functional units: a) compute units 118; b) load/store units 120; c) control units 122; and d) special compute units 124. The SGMF core 116 has an internal grid consisting of alternating columns of control units 122 and compute units 118. Each unit contains an operand buffer (also known as a "token buffer") and a reconfigurable switch that connects a tile to its eight nearest neighbors (8-NN). Units also contain configuration registers 126, 128, 130 that specify their token routing (destination nodes for the tokens) and opcodes (for compute units). The configuration registers 126, 128, 130 are written once, when a kernel is loaded.

The 8-NN topology is presented here by way of example, and not of limitation. Many other topologies can be implemented in an SGMF core. Design considerations include such factors as minimizing propagation delays for particular applications. In one example, reference is made to FIG. 10, which is a schematic figure of the hardware organization of an SGMF core 132, in accordance with an embodiment of the invention The SGMF core 132 has an internal grid consisting of a checkerboard pattern of control units 122 and compute units 118, and otherwise has the same facilities as the SGMF core 116 (FIG. 9).

The compute units 118 are very similar in design to a CUDA core in the Nvidia Fermi architecture. The compute units 118 consist of an arithmetical-logical unit (ALU 134) and a single-precision floating-point unit (FPU 136). Since the compute units 118 are pipelined and repeatedly execute a single static instruction; they do not block. Instructions flowing through compute units 118 thus execute in order. To boost performance, the fused multiply-add operation is also supported by the compute units 118.

The load/store units 120 are spread across the perimeter of fabric 138 and are connected to the banks of L1 cache 140 using a crossbar switch 142. The load/store units 120 include a reservation buffer 144 to allow multiple memory accesses to execute in parallel and epoch logic 146 to implement thread epochs as described above. The reservation buffer 144 also allows memory accesses to graduate out-of-order and for ready threads to bypass blocked ones.

Control units 122 implement the functionality of control nodes in the CDFG. These include the label nodes and join/split nodes. The control units 122 also include a FIFO, which is used to add delay slots when equalizing graph paths.

The special compute units 124 execute multiple non-pipelined arithmetic operations (div, sqrt) in parallel using multiple logic blocks. Each of these units can thereby be viewed by the compiler as a single virtually pipelined unit. Since the units consist of multiple logic blocks, they are larger than other types of units and are located on the perimeter of the SGMF core 116.

Each SGMF core 116 reorganizes the logic blocks available in each Fermi SM into a set of 108 functional units. These include 32 compute units, 32 control units, 32 LDST units and 12 special compute units (4 for integer division, 4 for single-precision floating-point division and 4 for square root computation). In comparison, a Fermi SM organizes the same units into 32 CUDA cores, each composed of a compute block (ALU and FPU, including division blocks) and a special function unit that implements square root operations. The fine-grain organization enables the SGMF core 116 to operate more functional units than a Fermi SM having the same amount of logic at any given time.

Interconnect.

The interconnect is implemented as reconfigurable crossbar switches that are configured once for each kernel. One way of configuring the switches is to distribute special tokens known as configuration tokens from the perimeter of the grid to the functional units. Other configuration techniques will occur to those skilled in the art. Since the configuration of the switches is static, new tokens can be sent through the switch on every cycle. Reference is now made to FIG. 11, which is a diagram illustrating an exemplary interconnect, in accordance with an embodiment of the invention. A 5×5 grid 148 is shown. The network topology is a folded hypercube, which equalizes the connectivity of the switches on the perimeter. Switches 150 are interconnected at distances of two (e.g., a switch at location [n; n] is connected to switches at [n2; n2]), which decreases the number of hops needed for connecting distant units on the fabric. In other words, the switches 150 may connect a processing unit with selected ones of its 8-NN and with selected contacting neighbors of its 8-NN. For example, each processing unit can connect directly to one of its four nearest neighboring processing elements or to one of its four nearest neighboring switches. In this manner, via the switches a unit can reach its destination with relatively few hops.

In the grid 148, each unit may be connected to the four nearest switches 150 and to the four nearest units. For example, control unit 152 is connected by broad solid lines to four switches 142. Control unit 152 is also connected to load/store units 154, 156, compute unit 158 and to control unit 160 Each of the switches 150 is also connected to 4 switches at a distance of 2 hops, as indicated by heavy curved lines 162.

Methodology.

RTL Implementation.

We have implemented the SGMF core in Verilog® (including all unit types and interconnect) to evaluate its components' power, area and timing. The design was synthesized and routed using the Synopsys® toolchain and a commercial 65 nm cell library. The results were then extrapolated for a 40 nm process. The estimated energy consumption of the individual operations was scaled down to the 40 nm process to fit the power consumption, area, and voltage level of the Fermi architecture. Similarly, we have verified that the area requirements of an SGMF core are smaller than those of a streaming multiprocessor as in the Nvidia Fermi processor.

Compiler.

CUDA code was compiled using Nvidia's LLVM-based nvcc compiler. We extracted the intermediate SSA code of the kernels from the compiler. Finally, we have developed an SGMF compiler backend, which compiles the intermediate SSA code to an SGMF configuration file.

Simulation Framework.

The comparative performance and power evaluation was done using the GPGPU-Sim cycle-accurate simulator and GPUWattch power model. The baseline for both performance and power models is the Nvidia GTX480 card, which is based on the Nvidia Fermi processor. We have extended GPGPU-Sim to simulate SGMF cores and used the GTX480 model by replacing the original SMs with SGMF cores. Reference is now made to FIG. 12, which is a table describing evaluation of the SGMF architecture using kernels from the Rodinia benchmark suite in accordance with an embodiment of the invention. Importantly, the benchmarks are used as-is and are optimized for SIMT processors.

The GPUWattch power model uses performance monitors to estimate the total execution energy. Using the per-operation energy estimates, obtained from the synthesis results, we have extended the GPUWattch power model to support SGMF cores.

The system configuration is shown in Table 3. By replacing the Fermi SMs with SGMF cores, we have fully retained the memory system design. The only differences between the Fermi and SGMF memory systems are that SGMF uses write-back and write-allocate policies in the L1 caches, as opposed to Fermi's write-through and write-no-allocate.

TABLE 3

| Parameter | Value |
| --- | --- |
| SGMF Core | 32 func./32 control/32 LDST |
| SGMF System | 15 SGMF cores |
| Fermi/GTX480 System | 16 streaming multiprocessors |
| Frequency [GHz] | core 1.4, Interconnect 1.4 |
| | L2 0.7, DRAM 0.924 |
| L1 | 64 KB, 8 banks, 128 B/line, 4-way |
| L2 | 786 KB, 6 banks, 128 B/line, 16-way |
| GDDR5 DRAM | 16 banks, 6 channels |

Evaluation.

We evaluated the SGMF architecture both at the single- and multi-core level. For both, we compared the performance and energy to that of a single SM in the Nvidia Fermi and the entire GTX480 system, respectively.

SGMF core.

In order to isolate the performance and energy benefits of the SGMF architecture, we first evaluated a single core (which uses a full GTX480 memory system). This isolation eliminates memory effects induced by inter-core cache contention.

Figure 13:
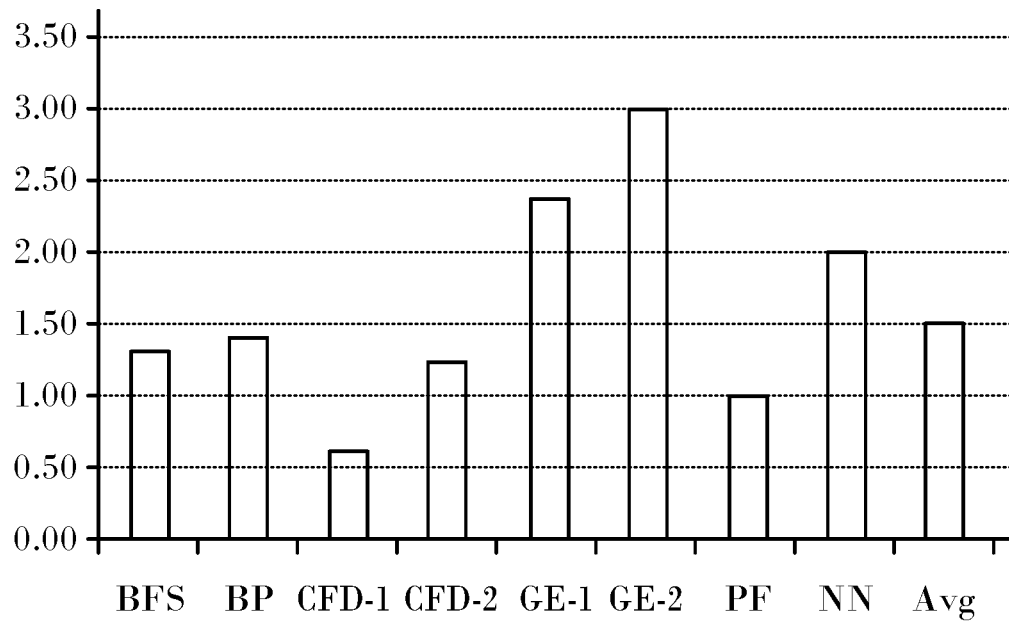
FIG. 13 is a graph showing performance of an SGMF core, in accordance with an embodiment of the invention.

Reference is now made to FIG. 13, which is a graph showing performance speedups obtained by an SGMF core over a Fermi SM, in accordance with an embodiment of the invention. The figure shows that the single-core SGMF processor enjoys consistent performance gains over the Fermi SM. Specifically, speedups ranging from 0.6 for CFD-1 to 2.9 for GE-2, with an average speedup factor of 1.45.

The main reason for the speedup is the amount of parallelism available in the SGMF core, compared with that available in the SM. In particular, the Fermi SM executes 32 instructions (a thread warp) every cycle. This limits its parallelism to at most 32 operations per cycle. In contrast, the SGMF core decomposes the same type and amount of logic available on the Fermi SM into 108 units that can execute in parallel. For example, the same logic available in a CUDA core, which can execute a single instruction per cycle on a Fermi SM, is distributed in the SGMF core into three units that can execute concurrently: regular compute instructions execute on a compute unit; control instructions execute on a control unit; and division instruction execute on a special compute unit. As a result, the SGMF core enjoys a peak instruction parallelism that is three times higher than that achieved by a conventional GPGPU.

Energy Efficiency.

Figure 14:
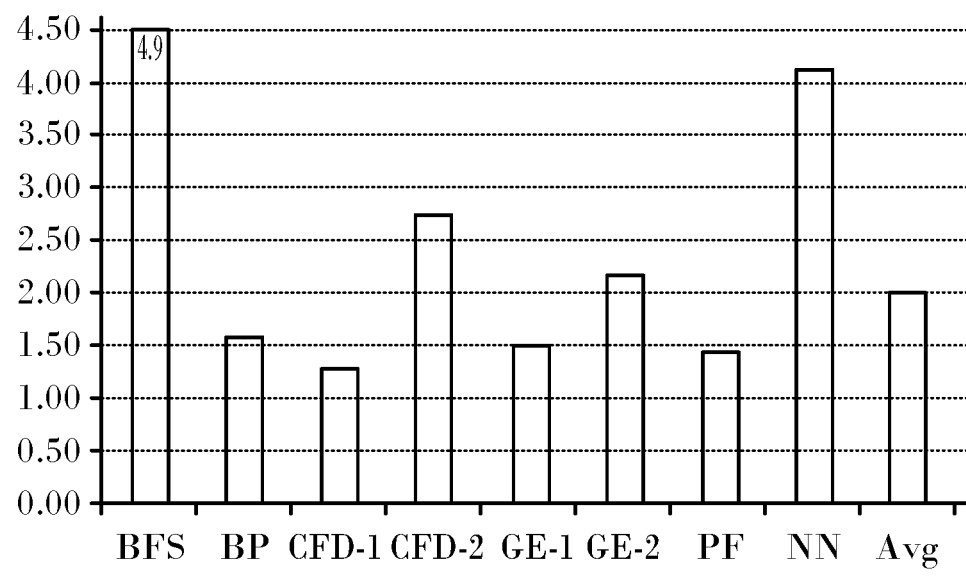
FIG. 14 is a graph describing the energy efficiency of an SGMF core, in accordance with an embodiment of the invention.

Reference is now made to FIG. 14, which is a graph comparing the energy efficiency of an SGMF core with that of a Fermi SM in accordance with an embodiment of the invention. The Figure depicts the ratio between the number of instructions per Joule achieved by each of the cores. The energy results refer to both static and dynamic energy, and include the energy consumed by the memory system. The results demonstrate the energy efficiency of the SGMF core, which provides 1.3 to 5 times as many instructions per Joule for the different benchmarks, with an average of 2. The energy efficiency of the SGMF is attributed to two factors: its increased parallelism over the SM core and its ability to eliminate most of the von-Neumann energy inefficiencies.

As noted above, the SGMF architecture uses the same amount and types of logic elements as are available in the Fermi SM. The SGMF architecture does, however, allow more elements to provide useful work in parallel. For example, SM CUDA cores include logic for both arithmetic and branch operations. Consequently, both its arithmetic and branch units are active on every cycle, but only one provides useful work. In contrast, the SGMF core splits the arithmetic and branch logic into two distinct unit types—the compute unit and the control unit, respectively. Therefore, the SGMF core expends the same amount of energy executing both logic elements on any given cycle, but can extract useful work from both. This reorganization of logic blocks dramatically improves the energy efficiency of the SGMF architecture.

In addition, the SGMF core expends most of its energy on the functional units and spends less energy on artifacts of the execution model, such as the pipeline and register file. For example, our examination of the power breakdown for the two cores (not shown) uncovers that the amount of energy spent on management structures in the SGMF core (interconnect, buffers, functional unit pipelines consume 67% less energy that the equivalent structures in the Fermi SM (register file, global pipeline, instruction scheduler).

In summary, we show that the SGMF core provides both better performance and higher energy efficiency than a Fermi SM.

Multicore SGMF Processor.

Figure 15:
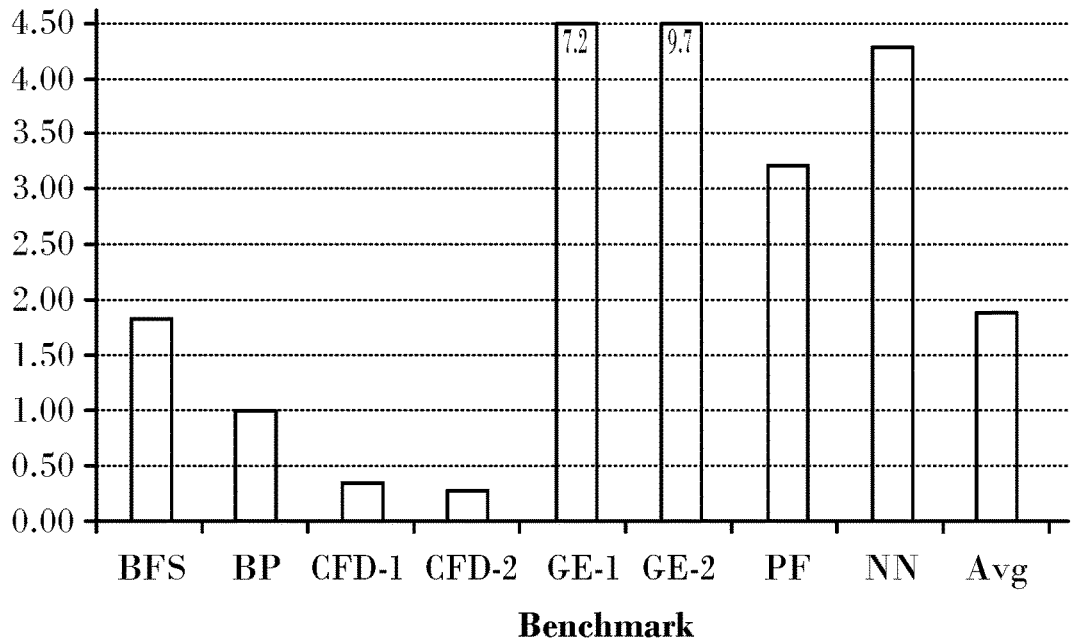
FIG. 15 is a graph showing performance of a multicore SGMF processor, in accordance with an embodiment of the invention.

We now turn to evaluate a full SGMF processor comprising 15 SGMF cores with a Nvidia Fermi GTX480 system comprising 15 SMs. Reference is now made to FIG. 15, which is a graph showing the speedup obtained by a multicore SGMF processor over the Fermi GTX480 system, in accordance with an embodiment of the invention. Interestingly, the figure shows erratic behavior, when compared with the consistent single-core speedups depicted in FIG. 13. The measurements in FIG. 13 and FIG. 15 both employ the same memory system configuration.

The multicore SGMF processor yields speedups that vastly range between factors of 0.3 and 4.7. Nevertheless, on average, the SGMF processor yields a speedup factor of 1.6. The erratic speedup results suggest that the SGMF memory behavior is quite different from that of the Fermi multiprocessor and may cause intense memory contention in a SGMF multicore configuration. Interestingly, benchmarks that do not contend for shared cache and memory resources greatly benefit from the SGMF cores. In particular, GE-1, GE-2 and NN achieve speedup factors of 3.5-4.7.

The distinct access patterns are explained by the nature of the two execution models. At any step, all SIMT threads execute the same dynamic memory instruction. In contrast, SGMF threads all execute distinct static memory instructions at any given time. Consequently, SIMT threads are typically optimized to coalesce their memory accesses, such that multiple concurrent accesses are directed to different cache banks.

Importantly, the Rodinia kernels used are optimized for SIMT processors rather than for SGMF. Moreover, the Fermi memory system is itself designed for the SIMT model. For its use with the SGMF processor, we only changed its write-through and write-allocate policies (as listed in Table 3).

In summary, the multicore performance comparison attests to the performance benefit of the SGMF core and, at the same time, motivates further research to design a memory system for the SGMF processor.

Energy.

Figure 16:
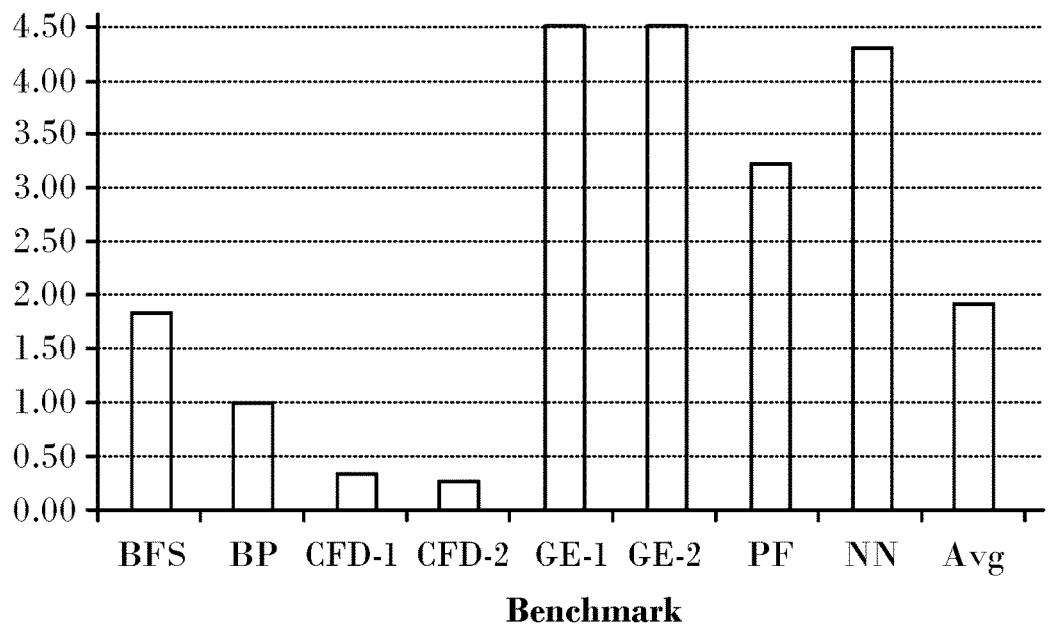
FIG. 16 is a graph depicting the energy usage of a multi-core SGMF processor, in accordance with an embodiment of the invention.

Reference is now made to FIG. 16, which is a graph depicting the ratio between the operations per Joule achieved by a 15-core SGMF processor over a Fermi GTX480 comprising 15 SMs. The SMs and the SGMF cores are configured in the same manner in the example of FIG. 14, in accordance with an embodiment of the invention. As expected, the figure shows an erratic behavior, which matches that shown in the multicore performance comparison.

For example, the CFD-1 and CFD-2 kernels, which exhibit intense contention in the cache system and achieve very low performance on the SGMF multicore, also exhibit degraded energy efficiency on that architecture. They achieve only 0.3 times the efficiency they enjoy on the Fermi. This degradation is directly attributed to the increased energy consumption of the memory system, triggered by the contention. Specifically, for As expected, the figure shows an erratic behavior, which matches that shown in the multicore performance comparison.

For example, the CFD-1 and CFD-2 kernels, which exhibit intense contention in the cache system and achieve very low performance on the SGMF multicore, also exhibit degraded energy efficiency on that architecture. They achieve only 0.3 times the efficiency they enjoy on the Fermi. This degradation is directly attributed to the increased energy consumption of the memory system, triggered by the contention. Specifically, for CFD-1 and CFD-2, the cache system consumes 5.5 and 7.5 times more energy, respectively, when serving the SGMF cores.

In contrast, the GE-1 and GE-2 kernels improve their energy by factors of 7.2 and 9.7 respectively. These benchmarks, which do not contend for shared cache resources, greatly benefit from the improved energy efficiency of the SGMF cores.

In conclusion, the evaluation highlights the high performance and energy efficiency of the SGMF architecture. Despite its susceptibility to cache contention on existing GPGPU memory systems, the multicore SGMF processor achieves an average speedup factor of about 1.6 and an improved energy efficiency factor of about 1.9 when compared to an Nvidia Fermi processor.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of computing, comprising the steps of:
providing a coarse grain fabric of processing units having direct interconnects therebetween;
representing a series of computing operations to be processed in the fabric as a control data flow graph having code paths, the computing operations comprising instructions to be executed in the fabric, the instructions having input operands;
establishing a configuration of the fabric by enabling and disabling selected ones of the direct interconnects to match the processing units to the code paths of the control data flow graph; and
executing the instructions of the computing operations in the fabric in multiple simultaneous threads by transmitting input operands of the instructions of different ones of the threads successively to a common receiving set of the processing units via the direct interconnects, wherein the configuration of the fabric does not change while executing the instructions of the computing operations in the fabric,
wherein executing the instructions comprises independently triggering each of the processing units in the common receiving set to execute the instructions of the computing operations upon availability of the input operands thereof.

2. The method according to claim 1, wherein the threads comprise instructions of the computing operations to be executed in individual processing units, and processing the computing operations comprises dynamically scheduling the instructions of at least a portion of the threads.

3. The method according to claim 2, further comprising grouping the threads into epochs; wherein dynamically scheduling comprises deferring execution in one of the processing units of a current instruction of one of the epochs until execution in the one processing unit of all preceding instructions belonging to other epochs has completed.

4. The method according to claim 2, further comprising the steps of:
making a determination that in the control data flow graph one of the code paths is longer than another code path; and
delaying the computing operations in processing units that are matched with the other code path.

5. The method according to claim 2, wherein the computing operations comprise loops that each of the threads iterate.

6. The method according to claim 5, wherein different threads perform different numbers of iterations of the loops.

7. The method according to claim 1, further comprising:
partitioning the series of computing operations into a sequence of smaller series;
executing the instructions of the computing operations in one of the smaller series in the threads;
storing intermediate results of the computing operations; and
iterating the steps of establishing a configuration and executing the instructions of the computing operations by all threads with another of the smaller series.

8. The method according to claim 1, wherein at least a portion of the processing units are interconnected by switches, further comprising configuring interconnections between the processing units by enabling and disabling the switches.

9. The method according to claim 8, wherein the switches are crossbar switches.

10. A computing apparatus, comprising:
a coarse grain fabric of processing units; and
direct interconnects between the processing units, wherein the fabric is operative for:
processing a series of computing operations, the computing operations being represented as a control data flow graph having code paths, the computing operations comprising instructions to be executed in the fabric, the instructions having input operands;
establishing a configuration of the fabric by enabling and disabling selected ones of the direct interconnects to match the processing units to the code paths of the control data flow graph;
executing the instructions of the computing operations in the fabric in multiple simultaneous threads by transmitting input operands of the instructions and values relating to a plurality of the threads to a set of the processing units via the direct interconnects, wherein the configuration does not change while executing the instructions of the computing operations in the fabric,
wherein executing the instructions comprises independently triggering each of the processing units in the set to execute the instructions of the computing operations upon availability of the input operands thereof.

11. The apparatus according to claim 10, wherein the instructions of the computing operations in the threads are executed in individual processing units, and processing the series of computing operations comprises dynamically scheduling the instructions.

12. The apparatus according to claim 11, wherein the fabric is operative for grouping the threads into epochs; wherein dynamically scheduling comprises deferring execution in one of the processing units of a current instruction of one of the epochs until execution in the one processing unit of all preceding instructions belonging to other epochs has completed.

13. The apparatus according to claim 11, wherein the fabric is operative for:
making a determination that in the control data flow graph one of the code paths is longer than another code path; and
delaying the computing operations in processing units that are matched with the other code path.

14. The apparatus according to claim 11, wherein the computing operations comprise loops that each of the threads iterate.

15. The apparatus according to claim 14, wherein different threads perform different numbers of iterations of the loops.

16. The apparatus according to claim 10, wherein the fabric is operative for:
partitioning the series of computing operations into a sequence of smaller series;
executing the instructions of the computing operations in one of the smaller series in the plurality of the threads;
storing intermediate results of the computing operations; and
iterating the steps of routing the direct interconnects establishing a configuration and executing the instructions of the computing operations by all threads with another of the smaller series.

17. The apparatus according to claim 10, further comprising switches that interconnect at least a portion of the processing units, and wherein the fabric is operative for configuring interconnections between the processing units by enabling and disabling the switches.

18. The apparatus according to claim 17, wherein the switches are crossbar switches.

* * * * *